Sept. 30, 1952         G. T. RANDOL         2,612,247
AUTOMOTIVE POWER DRIVE CONTROL SYSTEM AND MECHANISM
Filed April 5, 1944         10 Sheets—Sheet 1
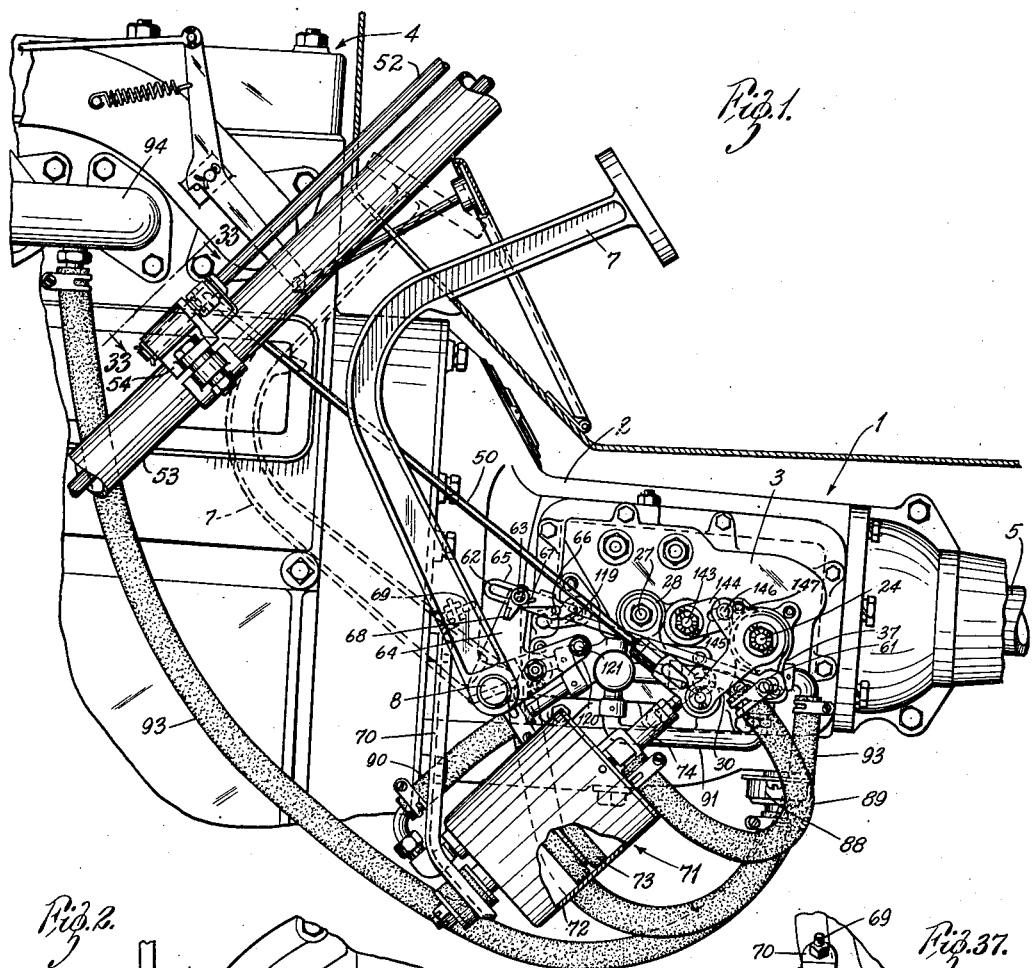
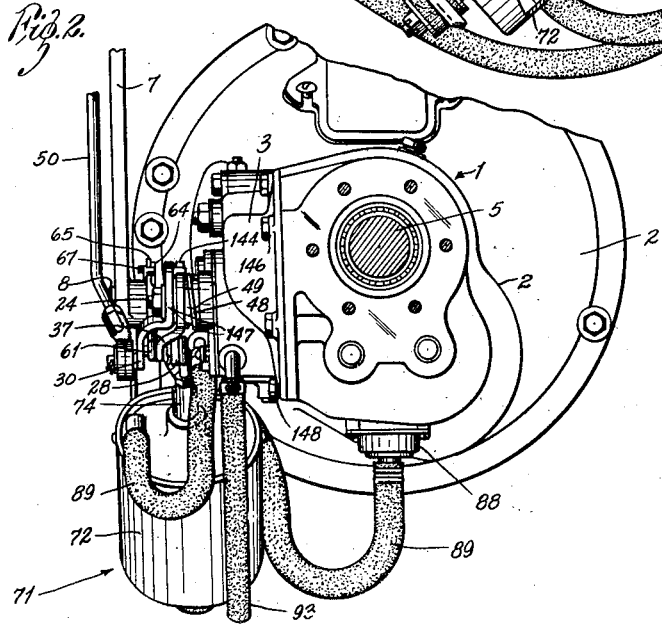
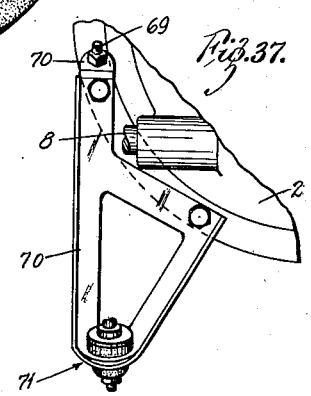
INVENTOR:
GLENN T. RANDOL,
By P. N. Lamphere
ATTORNEY.

Sept. 30, 1952          G. T. RANDOL          2,612,247
AUTOMOTIVE POWER DRIVE CONTROL SYSTEM AND MECHANISM
Filed April 5, 1944          10 Sheets-Sheet 2
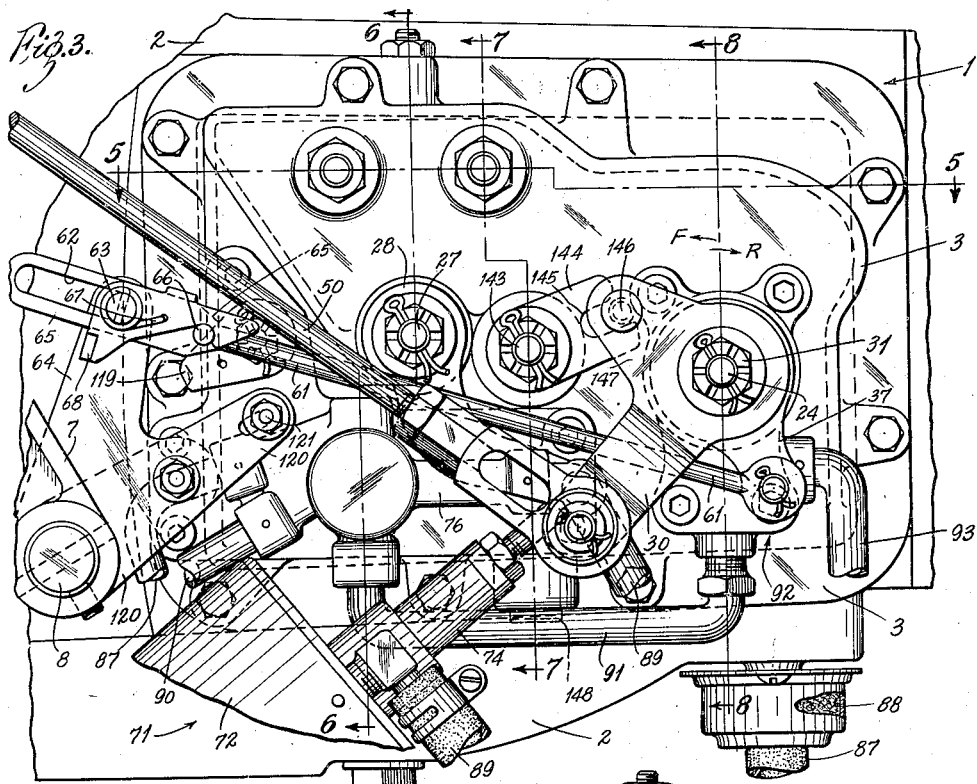
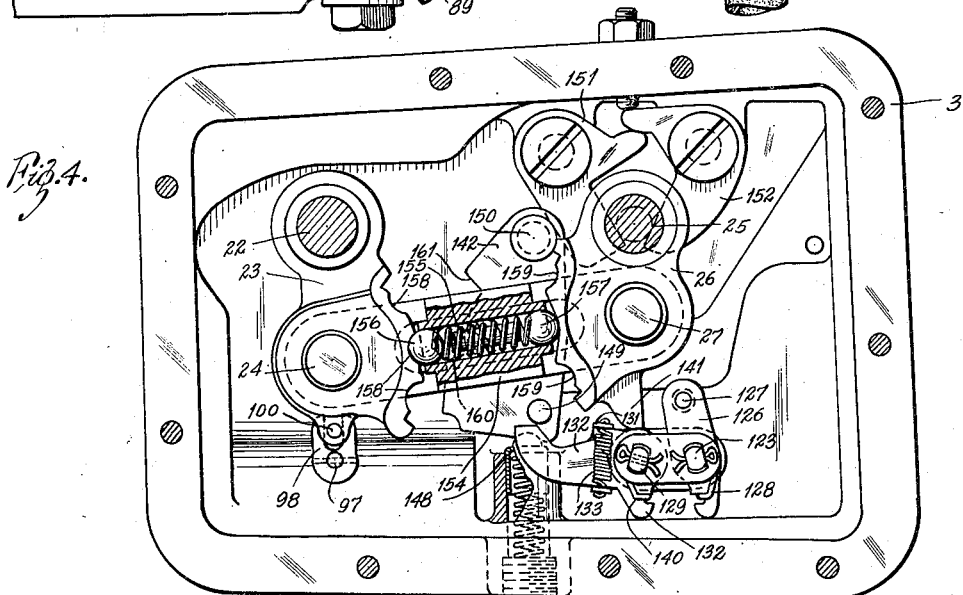
INVENTOR:
GLENN T. RANDOL,
By P. H. Lamphere
ATTORNEY.

Sept. 30, 1952 G. T. RANDOL 2,612,247
AUTOMOTIVE POWER DRIVE CONTROL SYSTEM AND MECHANISM
Filed April 5, 1944 10 Sheets-Sheet 3

INVENTOR:
GLENN T. RANDOL,
BY P. H. Lamphere
ATTORNEY.

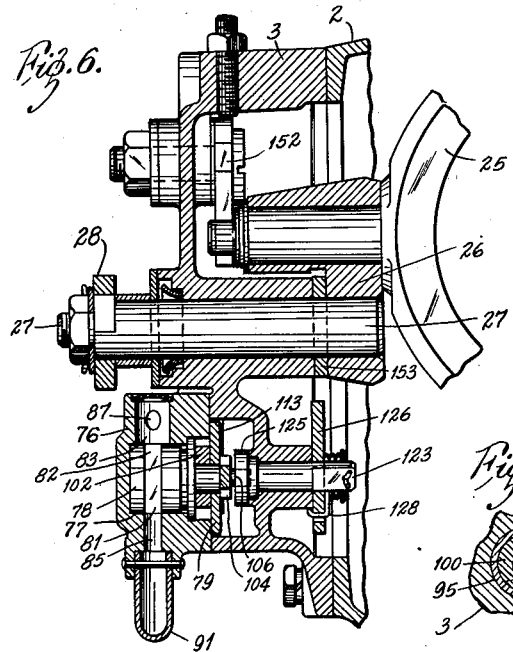

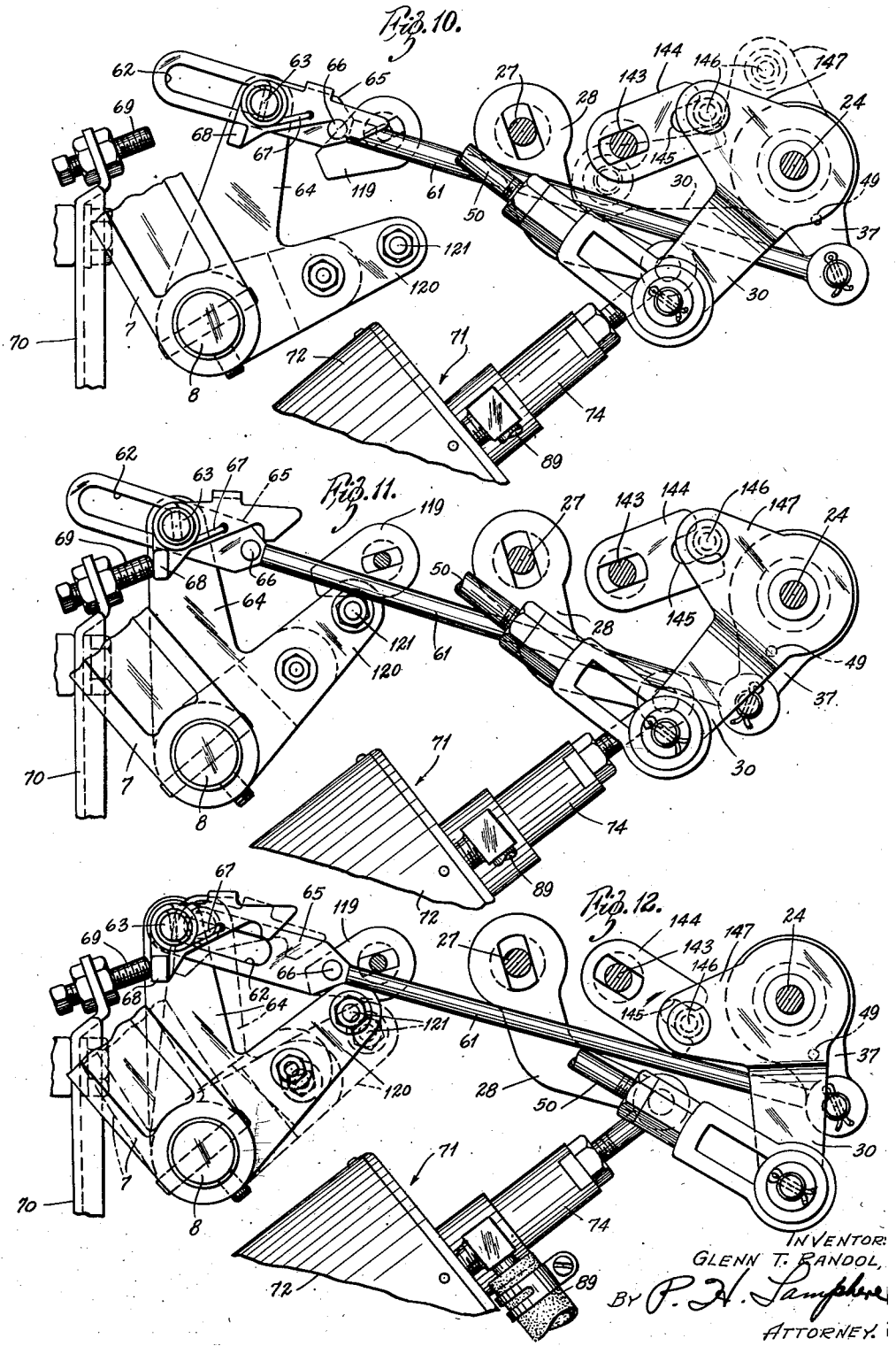

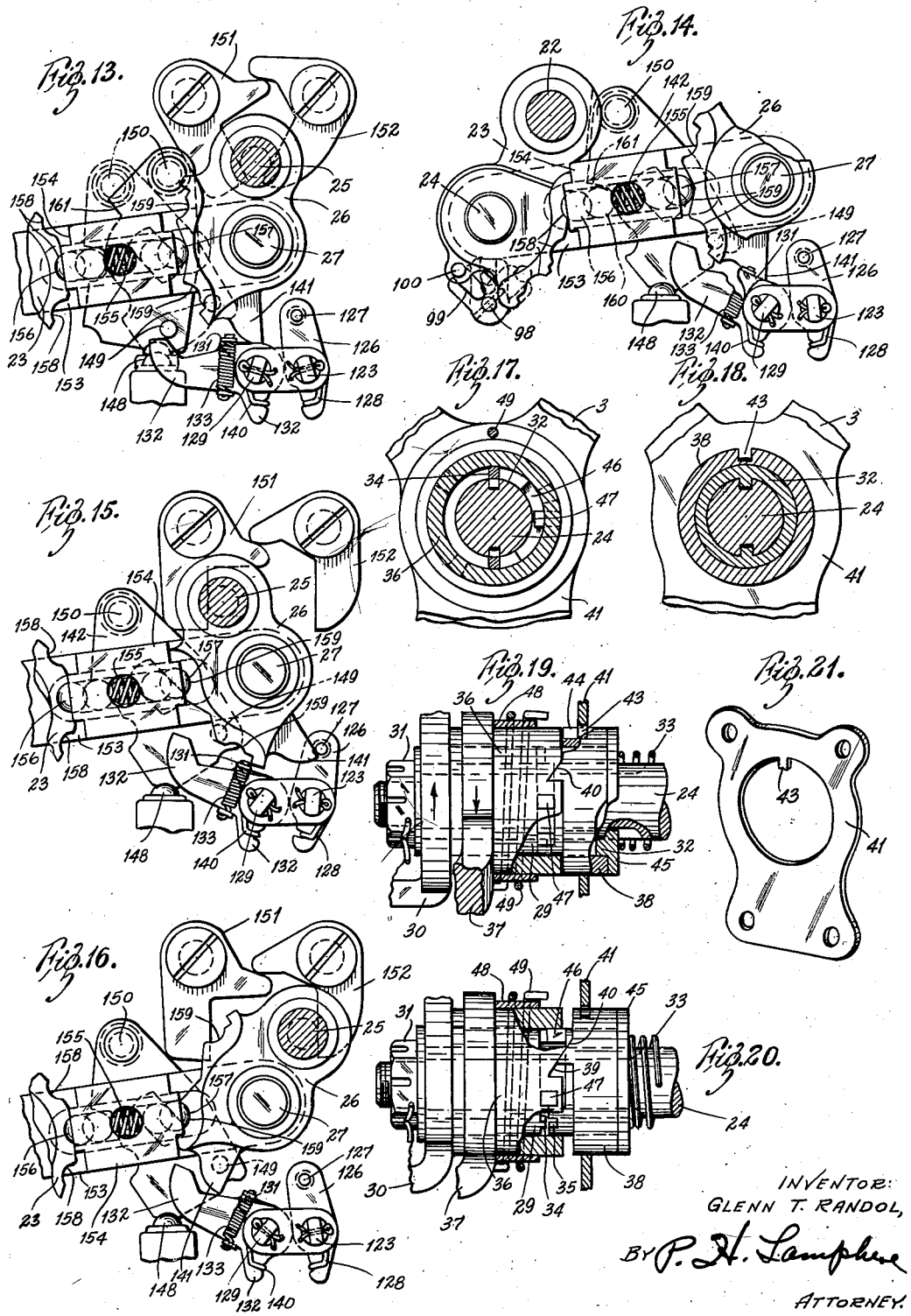

Sept. 30, 1952 G. T. RANDOL 2,612,247
AUTOMOTIVE POWER DRIVE CONTROL SYSTEM AND MECHANISM
Filed April 5, 1944 10 Sheets-Sheet 7
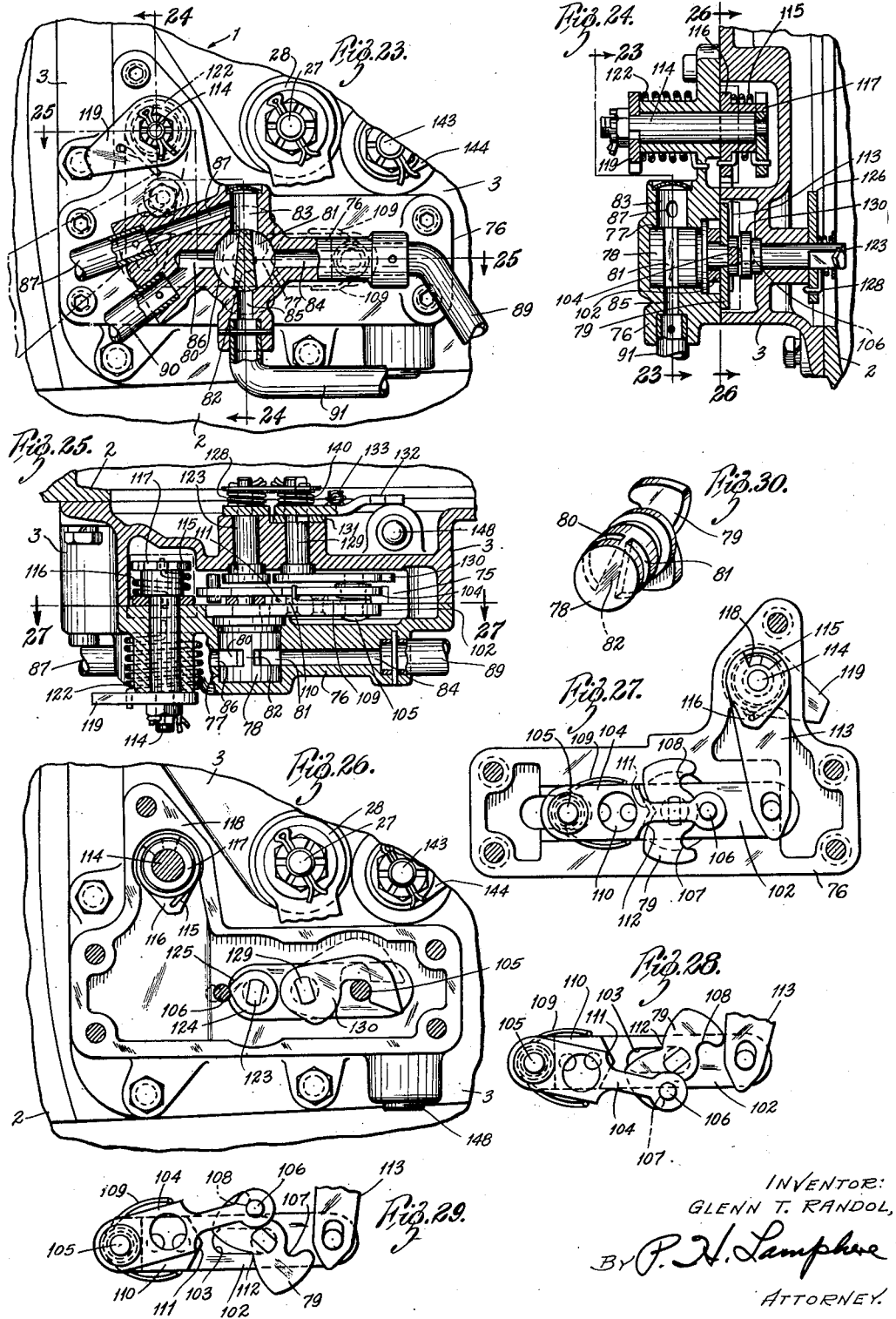
INVENTOR:
GLENN T. RANDOL,
BY P. H. Lamphere
ATTORNEY.

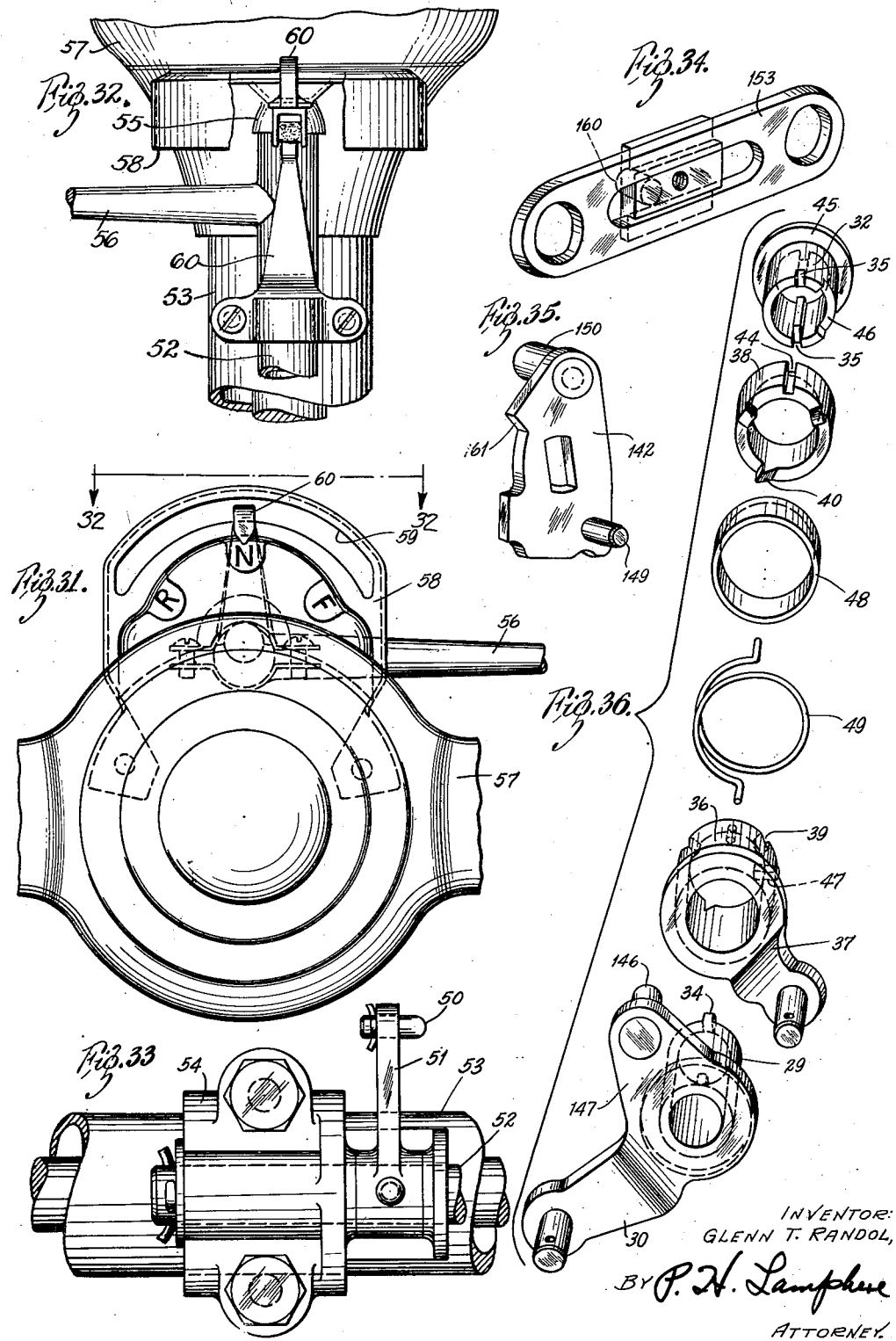

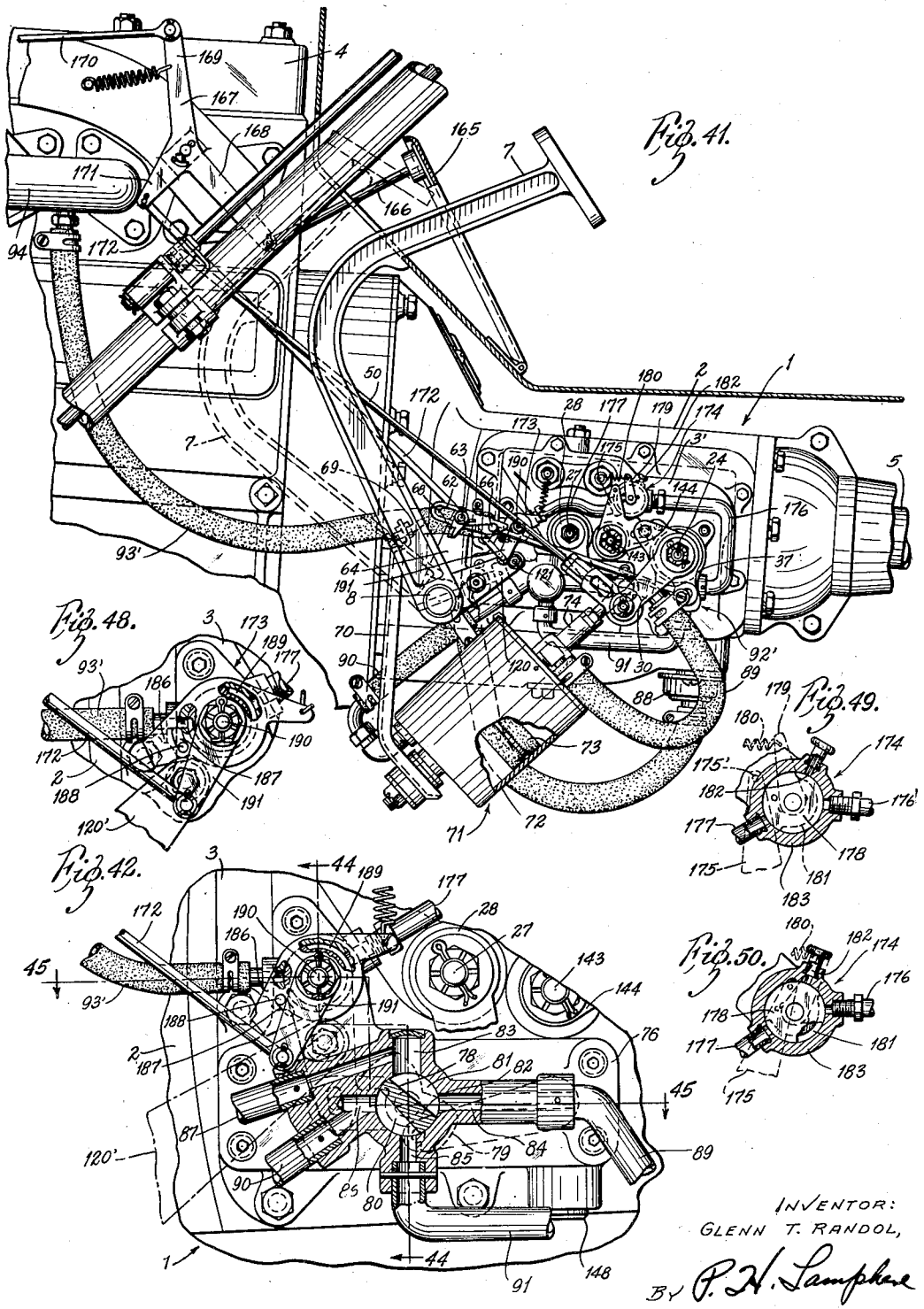

Sept. 30, 1952  G. T. RANDOL  2,612,247
AUTOMOTIVE POWER DRIVE CONTROL SYSTEM AND MECHANISM
Filed April 5, 1944  10 Sheets-Sheet 10
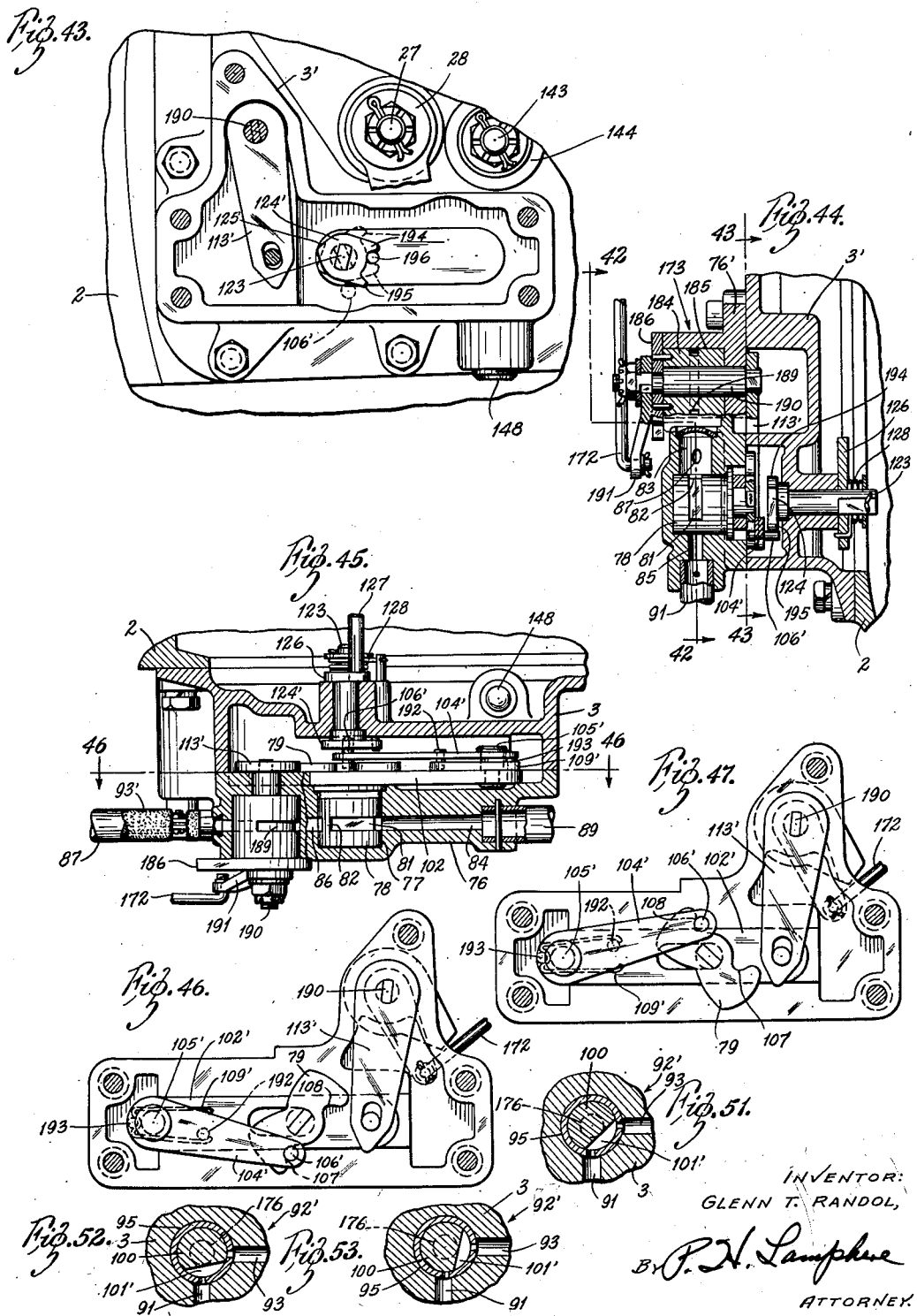

Patented Sept. 30, 1952

2,612,247

UNITED STATES PATENT OFFICE 2,612,247

AUTOMOTIVE POWER DRIVE CONTROL SYSTEM AND MECHANISM

Glenn T. Randol, St. Louis, Mo.

Application April 5, 1944, Serial No. 529,635

41 Claims. (Cl. 192—.048)

This invention relates to variable-ratio power drive systems for automotive vehicles, and in particular to novel and improved power- and personally-operable means for varying the ratios thereof and for operating the friction clutch to facilitate said ratio changing.

The invention seeks, as a salient object, to provide improved means for simplifying the control of a change-speed gearing having a plurality of different forward speed ratios or drives.

Another important object of my invention is to provide, in an automotive vehicle including a three speeds forward and reverse transmission, a simple and durable mechanism, power-operated in part, for operating said transmission, all of the forward speeds thereof being conditioned for operation by a single manual operation of said mechanism, and the second and high gear drives of the transmission being effected by power means, the latter operation being facilitated by personal operation of the friction clutch coupling.

A further object of my invention is to provide, in a power drive system of an automotive vehicle comprising an accelerator, a friction clutch coupling, a three speeds forward and reverse transmission, and a gear-shift lever; means for operating and facilitating the operation of the transmission, said means including power means comprising a servomotor, which is automatically operable after the shift-lever is placed in its forward drive controlling position and the accelerator is released into engine idling position, to establish the transmission either in its second gear drive or its high gear drive, upon declutching the friction clutch coupling to facilitate this operation of the transmission, said means further including manually-operated means for activating either low forward or reverse speed drive and establishing the neutral non-drive condition of the transmission at will.

A further object of my invention is to provide, in a power drive system of an automotive vehicle including a three speeds forward and reverse speed drive transmission, a friction clutch coupling and a gear-shift lever, a personally- and power-operated mechanism for operating the transmission and friction clutch, said mechanism being capable of manual operations to operate the transmission to effect low forward speed, neutral non-drive, and reverse speed drives thereof and also capable when the accelerator is in released engine idling position and the shift-lever is placed in low gear position, of causing a power operation of the transmission to alternately effect the high gear and second gear drives thereof, upon initial declutching of the friction clutch coupling to neutralize low speed gear, and subsequent declutching operations of the clutch to facilitate each of said power operations of the transmission; and another object of my invention is to include, in such a mechanism, means for disconnecting the shift-lever from the transmission when the latter is being power-operated or low speed gear neutralized in the manner above set forth.

Yet another object of my invention is to provide, in a power drive system of an automotive vehicle including a three speeds forward and reverse transmission, a friction clutch coupling and a transmission operating gear-shift lever, a personally- and power-operated mechanism for operating the transmission and clutch, said mechanism including a shift-lever and clutch operated force-transmitting linkage for personally operating the transmission in part, power means for operating the transmission to alternately establish the same in the high and intermediate speed drives upon declutching the clutch to facilitate said operations of the transmission, and means operable when the shift-lever is placed in its low speed forward drive position, to render the power means operative and to disconnect portions of the force-transmitting linkage to thereby prevent movement of the shift-lever out of said low speed drive position during the neutralizing operation of low speed drive and subsequent power-operation of the transmission, and a further object of the invention is to provide means for so controlling the power means as to accommodate an operation of the mechanism so that a resumption of the manual operation of the transmission into low forward speed, neutral non-drive, and reverse speed drives when it is desired to discontinue the power-operation thereof between high and intermediate speed drives.

A further object of my invention is to provide, in a power drive system of an automotive vehicle including a three speeds forward and reverse transmission, a friction clutch having a control pedal, and a transmission operating gear-shift lever, a personally- and power-operated mechanism for operating the clutch and transmission, said mechanism including a force-transmitting linkage system interconnecting the clutch control pedal and gear-shift lever with the transmission through a novel positive clutch means whereby manual gear-shift lever operations of the transmission into low forward speed, neutral non-drive, and reverse speed drive are accommodated with the pedal operated to declutching position, and neutralization of low speed drive by operation of the clutch pedal into declutching position and subsequent power-operation of the transmission into its intermediate and high speed drives without disturbing the low forward speed setting of the gear-shift lever.

An object related to the object immediately preceding is the provision of novel mechanism in the positive clutch means whereby a two-way clutching connection is automatically effective between the gear-shift lever and the low-reverse speed operating mechanism to accommodate selective operation of the transmission drive-mechanism into low speed forward drive, neutral non-drive, or reverse speed drive condition, said positive clutch mechanism also providing conversion of the two-way clutching connection into a one-way clutch connection to accommodate neutralization of the low speed drive without imparting movement to the gear-shift lever, and wherein the one-way clutching connection is automatically rendered ineffective and the two-way clutch connection effective by a movement of the gear-shift lever from forward drive range position to neutral non-drive position.

A further object of the invention is to provide improved control means for a change-speed gearing in which the movement of a single control member, such as a hand-operated lever, to a predetermined speed range position will condition for power-upshifting at least three of the forward gear ratios and alternately between second and third speeds after third speed has been activated, and the return movement of said single control member will positively neutralize any of the gear ratios which may be active.

Still another and more specific object of this invention is to provide an improved control means for a change-speed gearing having three forward speeds, which will enable the operator to manually obtain the lowest speed by a movement of an operator-controlled member from a neutral position to another predetermined position, and then subsequently to obtain the next higher and the highest speeds by the controlling of an actuatable member and without the necessity of changing the position of the operator-controlled member.

Yet another object of this invention is to embody in the control means above referred to, means which will enable the operator to alternately obtain intermediate and high speed drives at will by means of controlling an actuatable member only after the highest speed has once been established.

A further object of this invention is to embody in the control means referred to, means for enabling the operator to manually neutralize the gearing at will by merely returning the operator-controlled member to its neutral position.

A still further object of the invention is to embody in a control means of the type referred to, power means for performing the changing of the gearing to intermediate and high.

A further object of the invention is to embody in a control means for a change-speed gearing wherein two operator-controlled members are employed in establishing three forward gear set ratios, means enabling the operator to establish the lowest speed gear set by manual movement of one member and then subsequently neutralize said gear set by a personal movement of either of said members.

A further object of the invention is to provide improved control means for a change-speed gearing having three forward speed gear sets which will enable the operator to manually establish the lowest speed gear set by setting a member in a predetermined position, and then subsequently enable the operator to sequentially establish the intermediate and high speed gear set by successively controlling mechanism which is operable independently of the said settable member and which will further accommodate, after establishing said high speed gear set, the alternate establishment of the intermediate and high speed gear sets by further successively controlling the said mechanism.

A further object of this invention is to provide in a change-speed gearing control means of the type referred to, a single manually-controlled member movable from a neutral position to another predetermined position common to all forward speed gear sets, and wherein power means is employed to perform the shifting to intermediate and high speed gear sets including dual operator control means involving two operator controlled members, as, for example, a clutch pedal and an accelerator pedal.

A further object of the invention is to provide a control means for a change speed gearing which will enable the operator to cause power means to alternately establish two different forward gear ratios by successive depressing and releasing operations of an accelerator pedal.

A further object of the invention is to provide improved control means for a change-speed gearing which is simple in construction, efficient in operation, economical to manufacture, and which may be readily installed either at the factory as original equipment or on existing vehicles as an accessory.

Other objects of my invention will become apparent from the following description taken in connection with the accompanying drawings in which:

Figure 1 is a side view of a portion of a change-speed gearing and associated parts showing a control mechanism associated therewith and embodying my invention, the gearing and control mechanism having their parts in neutral position with the clutch pedal or actuating member shown in fully engaged position;

Figure 2 is a rear end view of Figure 1 showing the manner in which my improved control mechanism is mounted on the side of the gearing casing;

Figure 3 is an enlarged view of part of the structure shown in Figure 1;

Figure 4 is a view showing the parts on the inside of the gearing casing closure plate, said parts being in positions corresponding to neutral condition of the gearing;

Figure 6 is a sectional view taken on the line 6—6 of Figure 3;

Figure 7 is a sectional view taken on the line 7—7 of Figure 3;

Figure 8 is a sectional view taken on the line 8—8 of Figure 3;

Figure 9 is an enlarged rear view of the parts of my control mechanism and the gearing casing cover;

Figure 10 is a view of the movable parts mounted on the outside of the gearing casing cover, the parts being shown in their neutral positions corresponding to neutral condition of the gearing and the vehicle friction clutch in its fully engaged position;

Figure 11 is a view similar to Figure 10, but showing the position of the parts when the engine clutch pedal is fully depressed beyond clutch-disengaged position so as to release the lock;

Figure 12 is a view similar to Figure 11 showing the clutch pedal still in its fully disengaged position but having released the neutralizing mechanism for low gear so that low gear can be engaged by moving certain parts to the positions shown.

Figure 13 is an enlarged view of the parts on the inside of the casing cover and associated with the function of the second and high gear shifter fork, said parts being in their neutral position as viewed in Figure 4;

Figure 14 is a view of some of the parts shown in Figure 4, said parts being in positions where low gear ratio is operative and the control valve for operating the second and high gear ratios conditioned for operation as a result of the vehicle clutch pedal being in the fully depressed position shown in Figure 12;

Figure 15 is a view similar to Figure 13 but showing the parts in positions where low gear is neutralized and second gear ratio is operative;

Figure 16 is a view similar to Figure 15 but showing the parts in positions where high speed ratio is operative;

Figure 17 is a view taken on the line 17—17 of Figure 9;

Figure 18 is a view taken on the line 18—18 of Figure 9;

Figure 19 is a view showing the mechanism for manually neutralizing low gear ratio prior to the causing of the second and high gear ratios to be operative, said mechanism being in the position corresponding to neutral condition of the gearing;

Figure 20 is a view similar to Figure 19 but showing the parts in the positions assumed immediately following the neutralizing of low gear ratio by fully depressing the clutch pedal;

Figure 21 is a perspective view showing the locking plate associated with the mechanism shown in Figures 19 and 20;

Figure 22 is a sectional view showing the open condition of the shut-off valve, said view being taken on the line 22—22 of Figure 8;

Figure 23 is a side view taken on the line 23—23 of Figure 24, of my improved power cylinder control valve, said valve being in position to connect both ends of the power cylinder with atmosphere;

Figure 24 is a vertical sectional view taken on the line 24—24 of Figure 23;

Figure 25 is a horizontal sectional view taken on the line 25—25 of Figure 23;

Figure 26 is a view taken on the line 26—26 of Figure 25;

Figure 27 is a view of the valve parts in their locked position as viewed on the line 27—27 of Figure 24;

Figure 28 is an operated view of the parts shown in Figure 27, said parts being in positions corresponding to second gear ratio condition of the gearing;

Figure 29 is a view similar to Figure 28 but showing the parts in positions corresponding to high gear ratio condition;

Figure 30 is a perspective view of the control valve element and double arm lever for rotating it;

Figure 31 is an operator's view of the dial indicator and associated pointer connected to the hand shift-lever;

Figure 32 is a view of the dial indicator of Figure 31 taken from the line 32—32 thereof, and showing details of the mechanical connection between the hand shift-lever and said pointer;

Figure 33 is a view taken on the line 33—33 of Figure 1;

Figure 34 is a perspective view of the interlock supporting plate;

Figure 35 is a perspective view of the master neutralizing arm for second and high speed gear sets;

Figure 36 is an exploded perspective view of the parts of the neutralizing mechanism controlled by the clutch pedal for neutralizing low gear, said parts being those shown in Figures 19 and 20;

Figure 37 is a view of the power cylinder mounting bracket and the adjustable stud for releasing the low gear neutralizing mechanism after low gear has been neutralized;

Figure 41 is a view similar to Figure 1 but showing a modified control mechanism wherein the accelerator pedal is employed for actuating the power cylinder control valve to its operative position and the clutch pedal is utilized only for causing the gear ratio change to be accomplished;

Figure 42 is an enlarged view of the modified control valve, said view being taken on the line 42—42 of Figure 44 and the parts being shown with the accelerator in fully released engine idling position and the main clutch pedal in fully engaged position and the control valve element in a position corresponding to second gear ratio condition;

Figure 43 is a view of the operating lever and selector cam as employed in the modified form, said view being taken on the line 43—43 of Figure 44;

Figure 44 is a vertical sectional view taken on the line 44—44 of Figure 42;

Figure 45 is a horizontal sectional view taken on the line 45—45 of Figure 42;

Figure 46 is a view of the valve operating parts as viewed on the line 46—46 of Figure 45, said valve element being in a position corresponding to second gear ratio condition;

Figure 47 is a view similar to Figure 46 but showing the valve element in a position corresponding to high gear ratio condition;

Figure 48 is a view showing the clutch pedal actuated shut-off valve moved to its open position by the fully disengaged position of the clutch pedal;

Figure 49 is an enlarged view, partly in section, of the shut-off valve controlled by the master neutralizing lever, said valve being in shut-off condition;

Figure 50 is a view similar to Figure 49 but showing the valve in its open position; and Figures 51, 52, and 53 are sectional views showing the shut-off valve element associated with the low and reverse gear shifting fork in its three positions corresponding to neutral, low gear, and reverse gear condition, respectively, of the gearing.

Figure 5:
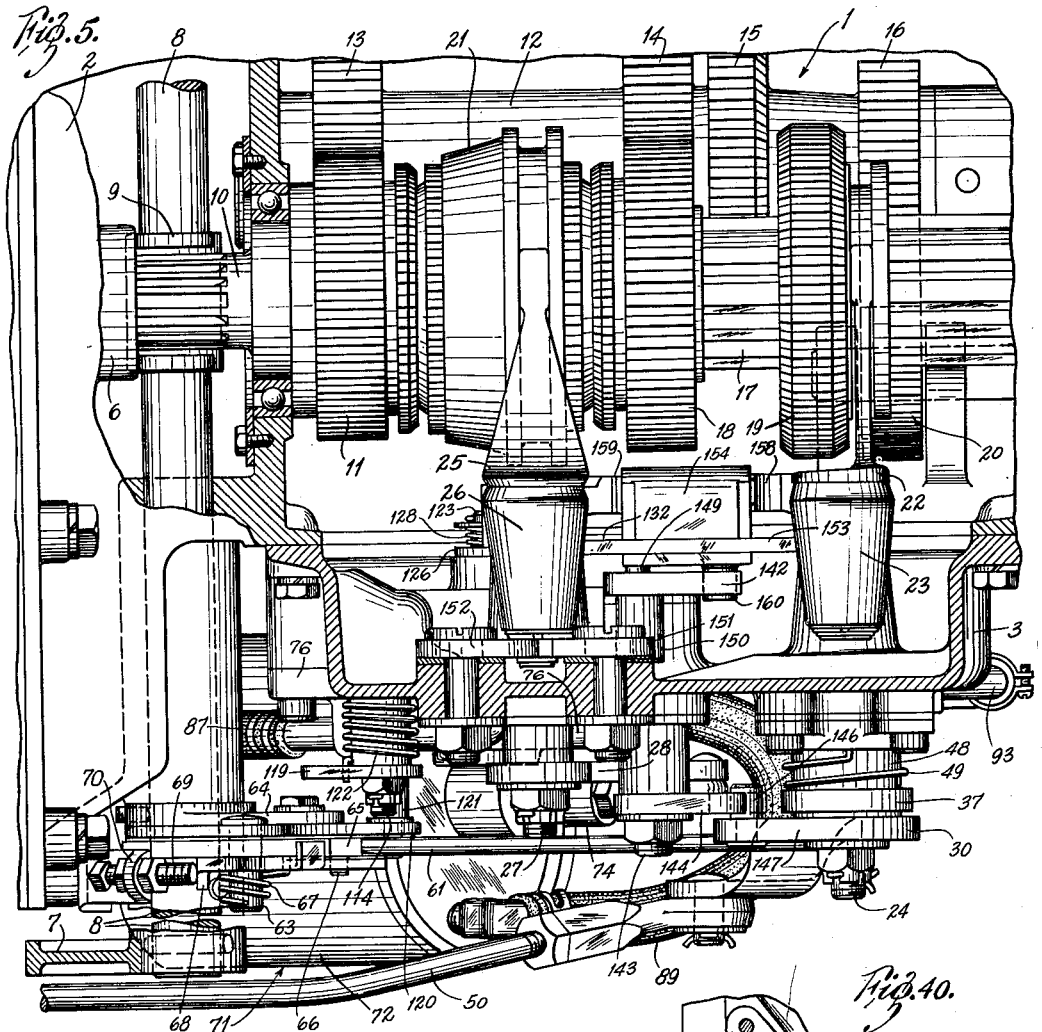
Figure 5 is a partial sectional view showing the gearing and control mechanism with the shiftable elements of the gearing in neutral position.

Referring to the drawings in detail and first to Figures 1 and 5, there is disclosed a conventional change speed gearing generally indicated by the numeral 1 with which my improved control mechanism is associated, this gearing being enclosed in a casing 2 provided with a cover plate 3 and situated between the usual engine 4 of the vehicle and the usual propeller shaft 5. Between the engine and the change speed gearing is the usual friction clutch coupling mechanism (not shown) having an actuating sleeve 6 (see Figure 5), said clutch being employed to disconnect the transmission of the power from the engine to the gearing for any desired purpose including the facilitating of gear ratio changing. This clutch is controlled through sleeve 6 by the clutch pedal 7 and a cross-shaft 8 carrying a fork 9.

The particular change speed gearing illustrated is a conventional type having three forward speed drives and a reverse gear drive. The gearing arrangement is shown in Figure 5 and comprises a driving shaft 10 and a driving gear 11 which is connected through the friction clutch so as to be driven by the crankshaft of the engine. The gear 11 constantly drives a countershaft 12 which carries gears 13, 14, 15, and 16, gear 13 being in constant mesh with gear 11. Axially aligned with the driving shaft and gear 11 is a driven shaft 17 connected to the propeller shaft 5 and having rotatably mounted thereon a gear 18 constantly meshing with gear 14 of the countershaft to thereby provide the second or intermediate gear ratio. The driven shaft 17 has splined thereon a combined low and reverse gear 19 which is adapted to be engaged with an idler gear 20 constantly meshing with gear 16 on the countershaft to thus provide the reverse gear ratio or when engaged with the countershaft gear 15 to provide low speed ratio. Also splined on the driven shaft is a double clutch element 21 which is positioned between gears 11 and 18 and is employed to selectively connect either gear 18 to the driven shaft or the driven shaft directly to the combined driving shaft 10 so as to provide a direct or high speed drive.

The combined low and reverse gear 19 is controlled by a shifting fork 22 which is pivotally mounted in an arm 23 secured to the inner end of a shaft 24 journaled in the rear end of the gearing casing cover 3 (see Figure 8). By rotating this shaft in opposite directions the shifting fork 22 and gear 19 may be shifted in opposite directions from neutral or central position shown in Figure 2 to thereby obtain low or reverse gear ratios. The double clutch element 21 is controlled by a shifting fork 25 which is pivotally mounted in an arm 26 secured to the inner end of a shaft 27 journaled in the forward end of the casing cover 3. The outer end of this shaft has secured thereto an arm 28 for rotating the shaft to thereby move the shifting fork 25 and the double clutch element 21 in either direction from neutral position, as shown in Figure 2, to thereby establish the second or intermediate speed ratio or the high (direct) speed ratio.

Referring to Figures 8, 9, 17, 18, 19, 20, 21 and 36, the mechanism associated with the controlling of the low and reverse gear shifting fork 22 will now be described. The portion of shaft 24 which extends to the outside of the cover plate 3 has rotatably mounted thereon a sleeve 29 provided with an arm 30, the sleeve and arm being maintained on the shaft by a nut 31. A second sleeve 32 is positioned inwardly of the sleeve 29, said sleeve being splined to the shaft 24 and backed by a coil spring 33. The sleeve 29 carries opposed lugs 34 on its inner end for cooperation with slots 35 on the adjacent end of the sleeve 32 to thus provide a two-way clutch means between the two sleeves whereby sleeve 29 can rotate sleeve 32 and shaft 24 whenever the clutch is engaged. A third sleeve 36 is rotatably mounted upon sleeve 29 and the outer end of this sleeve carries an actuating arm 37. Also mounted on sleeve 32 is a fourth sleeve 38. The inner end of sleeve 36 is provided with spaced cam notches 39 which are arranged to cooperate with cam lugs 40 on the adjacent end of sleeve 38. Sleeve 38 is held from rotation by a plate 41 clamped to cover 3 by a bearing plate 42, said plate 41 carrying a projection 43 which is received in a slot 44 in the surface of sleeve 38. The sleeve 38 is arranged to move sleeve 32 axially by engaging a flange 45 carried on the inner end of the latter sleeve. It is thus seen by the construction and arrangement of sleeves 32, 36, and 38 that upon rotation of sleeve 36 in the direction of the arrow (Figure 19) sleeve 38 will be moved axially away from sleeve 36 by the camming action between notches 39 and lugs 40. The axial movement of sleeve 38 will carry with it sleeve 32 and thus disengage the clutch means between sleeves 29 and 32 which comprise lugs 34 and slots 35.

The inner end of sleeve 32 between clutch slots 35 is provided with an arcuate slot 46 for receiving a square pin 47 carried by sleeve 36, to provide a one-way clutch means between sleeves 32—36 when said pin is in abutting relationship with an end of slot 46. When the parts are in the positions shown in Figure 19, the pin will lie approximately in the central part of slot 46, thus accommodating limited relative movement in either direction between sleeve 36 and sleeve 32. A protecting sleeve 48 surrounds sleeve 36 and outside thereof is a coil spring 49 having one end connected to the bearing plate 42 and its other end connected to lever 37 (see Figures 8 and 9).

When the gear shifting fork for the low and reverse gear 19 is in its neutral position, the parts of the mechanism on the outer end of shaft 24 will be in the positions shown in Figure 19. Levers 30 and 37 on the outer ends of sleeves 29 and 36 will have the positions shown in Figures 3, 10, and 11. Under these conditions sleeve 29 will be clutched to sleeve 32. Consequently, if lever 30 is given a clockwise rotation from the position shown in Figures 3, 10, and 11, shaft 24 will be rotated therewith in a clockwise direction, and gear 19 meshed with the idler gear 20 to establish reverse speed ratio. Sleeve 36 will not be moved due to slot 46. If lever 30 should be given a counter-clockwise rotation from the position shown in Figures 3, 10, and 11, shaft 24 will also be rotated therewith due to the clutch connection between sleeves 29 and 32. This will move gear 19 forwardly into mesh with the countershaft gear 15 to establish low speed ratio.

Lever 30 is adapted to be operator-controlled by a gear shift handle or lever which is mounted on the steering column of the vehicle. As best shown in Figures 1, 3, 31, 32, and 33, a rod 50 connects lever 30 with an arm 51 secured to the lower end of a shaft 52, said shaft being in parallel relation to the steering column 53 with its lower end journaled in a bearing bracket 54 carried by the lower end of the steering column and its upper end journaled in a bearing 55 carried by the upper end of the steering column. Adjacent this latter bearing the shaft has secured thereto a handle 56 which extends outwardly in parallel relation to the plane of the steering wheel 57. Also carried by the steering column above the handle is a bracket 58 having a slot 59 and adjacent indicia (see Figure 31). The indicia employed are the numerals "R," "N," and "F" to indicate reverse, neutral, and forward, it being noted that the "N" indicia lies between the "R" and the "F" indicia which are placed at the ends of the slot. A pivotally mounted pointer 60 is operatively connected to the upper end of shaft 52 for rotation therewith as illustrated in Figure 32, and has its free end arranged to be received in slot 59.

When handle 56 is in the "N" position the combined low and reverse gear 19 will be in its neutral position, as shown in Figure 5. If the handle should be moved so that the pointer indicates "R," then reverse gear ratio will be established. If the handle is moved so that the pointer indicates "F," low speed ratio will be established and intermediate and high speeds conditioned for power operation.

The lever 37, which is carried by sleeve 36 surrounding sleeve 29, is adapted to be controlled by clutch pedal 7 of the main clutch. The connection provided between the clutch pedal and lever 37 is best shown in Figures 1, 3, 10, 11, and 12, and comprises a rod 61 connected to lever 37 at one end, and provided with a slot 62 at its other end for receiving a pin 63 carried by an arm 64 secured to the clutch controlling shaft 8. Pin 63 has pivotally mounted thereon a dog 65 for cooperation with a pin 66 on the rod whereby arm 64 may be locked to the rod whenever the clutch pedal is depressed. The dog 65 is normally biased into locking position by a spring 67 and is arranged to be unlocked when projection 68 carried thereby engages with an adjustable stud 69 mounted on a bracket 70 secured to the gearing casing 2 by the same bolts that hold the casing to the engine (see Figures 1 and 37). The stud bolt 69 is not engaged until the clutch pedal is depressed to a position beyond that required to disengage the main clutch. When the dog becomes unlocked, rod 61 will be free to return to its normal position, as best shown in Figure 12.

Thus it is seen that when the clutch pedal is moved to fully depressed position, lever 37 and sleeve 36 are given a rotation by the clutch pedal from the position shown in Figure 19 to that shown in Figure 20 and released to return to the position shown in Figure 19 without the necessity of releasing the clutch pedal. The rotation of sleeve 36 by the clutch pedal will result in sleeve 38 being moved axially and when dog 65 is released, sleeve 38 will be returned by the action of spring 33. During the rotation of sleeve 36 there will be no rotation of shaft 24 due to the fact that the square pin 47 will be merely moved to the lower end of slot 46 in the end of sleeve 32. The sleeves 29 and 32 will be unclutched by the rotation of sleeve 36, but they will again be clutched together whenever the dog releases rod 61 from its connection with the clutch pedal arm 64 and spring 49 returns sleeve 36 to the position shown in Figure 19.

If the hand lever 56 be set from the neutral "N" position to the forward drive "F" position, the arm 30 and the first sleeve 29 will be rotated counterclockwise (see Figures 1, 3, 10, 12, and 36). The two-way connected clutch elements 34, 35 will transmit this rotational movement into similar counterclockwise rotation of the second sleeve 32, and thence to the shaft 24 to effect engagement of first speed drive. During this operation, the third sleeve 36 is not rotated, nor is the sleeve-ring 38. Rotational movement is aforesaid of the second sleeve 32 without imparting any movement to the third sleeve 36, places the lower end (Figure 36) of the slot 46 of the second sleeve adjacent to the pin 47 carried by the third sleeve 36, the slot accommodating such lost-motion relative movement between the sleeves 32, 36.

Thereafter, when the clutch pedal 7 is operated to torque-interrupting position, the arm 37 is rotated to move the third sleeve 36 clockwise. The initial part of such sleeve movement draws the cam notches or grooves on the sleeve 36 along confronting cam rises 40 on the axially movable sleeve-ring 38, displacing it and the sleeve 32 axially through continuous abutting relationship of the inner end of the sleeve-ring 38 with the annular flange 45. This initial movement displaces the second sleeve 32 axially and disengages the lugs 34 from their cooperating notches or slots 35 of the two-way clutch means between the first sleeve 29 and the second sleeve 32. These lugs are axially shorter than the pin 47 on the third sleeve, and the pin 47 is not withdrawn from the slot 46 in the end of the sleeve 32 by the aforementioned axial movement. The initial angular movement of the sleeve 36 as stated positions the pin 47 adjacent to the lower end (Figure 36) of the open slot 46 for subsequent movement into the one-way connecting relationship thereto. Thereupon, further angular movement of the arm 37 and sleeve 36 by the pedal 7 through interconnecting mechanism will cause the pin 47 to engage the end of the slot 46 and return the sleeve 36 and the first speed gear 19 to neutral-drive position, without imparting any movement to sleeve 29. The peaks of the cams 40 will ride upon the outer end of the sleeve 36 and thus maintain the two-way clutch connection 34, 35 disengaged during the pedal-neutralizing of the gear 19, to prevent disturbing the "F" position setting of the hand lever 56. Upon return of the hand lever 56 to its "N" position, the two-way clutch connection will be restored effective automatically so that gear 19 may be manually-controlled into its different operative positions independently of the aforementioned pedal operation thereof. It is thus seen that the clutch pedal is employed to neutralize low gear upon the first depressing movement thereof following the establishment of the low speed ratio by movement of the handle 56 mounted below the steering wheel.

The previously referred to lever 28, which is secured to the outer end of shaft 27 for operating the gear shifting fork 25 for the double clutch element 21, is operatively connected to be moved by a power cylinder or vacuum-operated servomotor shown as one example of power means and generally indicated by the reference numeral 71. This power cylinder comprises a cylinder 72 mounted at one end to an extension of the previously mentioned bracket 70 secured to the gearing housing. Within the cylinder is a piston 73 having a piston rod 74 which extends through the rear end of the cylinder and is connected to lever 28. The piston 73 is arranged to be in the central part of the cylinder when the double clutch element is in its neutral position as shown in Figure 5. By this arrangement a movement of the piston to the forward end of the cylinder results in the double clutch element connecting gear 18 to the driven shaft to establish second speed ratio, and a movement of the piston to the rear end of the cylinder results in the double clutch element directly connecting the drive and driven shafts together for high speed ratio or direct drive.

The power cylinder is controlled by a main distributing valve means which is embodied in the lower part of the forward end of the gear casing cover 3. As will be noted from Figures 24, 25, and 26, the casing cover has a compartment 75 which is closed by a cover plate 76. Within this cover plate is a bore 77 receiving a cylindrical distributing valve element 78 which has secured thereto on its inner end, a double arm lever 79, said valve element and double arm lever being shown in Figure 30. The valve element is provided with opposed slots 80 and 81 which are divided by a web portion 82. The cover plate 76 is provided with four passages 83, 84, 85, and 86 (see Figure 23) communicating with bore 77 of the valve element at points spaced 90° apart. The top passage 83 is adapted to communicate with the atmosphere through a conduit 87, said conduit leading to an air filter 88 which is secured to the bottom side of the gearing casing 2, as best shown in Figures 1 and 3.

The rear passage 84 is connected by a conduit 89 with the rear end of cylinder 72 of the power cylinder. The forward passage 86, which is opposite passage 84, is connected by a conduit 90 with the forward end of cylinder 72 of the power cylinder.

The bottom passage 85 is connected by a conduit 91 with a shut-off valve 92 mounted in the rear end of the gearing casing cover below the shifting fork operating shaft 24 (see Figure 8). From this shut-off valve a conduit 93 leads to a source of pressure fluid, shown by way of example, as an inlet manifold 94 of the engine 4. The shut-off valve 92 is employed to cut off the connection between the manifold and the distributing valve and comprises a bore 95 in the cover which receives a cylindrical valve element 96. The valve element has connected thereto an operating shaft 97 which extends to the inside of cover 3 and carries on its inner end an arm 98. This arm is provided with an open-ended slot 99 for reception of a pin 100 carried by a projection on arm 23 below shaft 24. The valve element 96 (shown in section in Figure 22) is so provided with a cross-slot 101 that conduits 91 and 93 can be placed in communication with each other. As shown in Figure 22, the valve is positioned so as to place the two conduits in communication with each other and, under these conditions, arm 98 will be in the position shown in Figure 4 which is the position of the shifting fork carrying arm 23 corresponding to the neutral condition of the combined low and reverse speed gear 19. Whenever the arm 23 is turned in either direction from the position shown in Figure 4, the pin and slot arrangement between arm 23 and arm 98 will result in the moving of valve element 96. If arm 23 is moved to established reverse gear ratio, the shut-off valve will move to closed position. If arm 23 is moved to establish low speed ratio, the valve will also become closed. When low speed ratio is neutralized, the valve will become open when gear 19 becomes disengaged from gear 15. The positions of the valve slot corresponding to low and reverse gear ratios are shown in dashed lines in Figure 22. The various positions of arm 98 which controls the valve element of the shut-off valve are shown by full and dashed lines in Figure 14.

Referring again to the distributing valve and particularly to the structure shown in Figures 23 to 29, the valve element 78 thereof is adapted to be actuated by a reciprocating bar 102 mounted for sliding movement in the cover plate 76, said bar having a slot 103 through which extends the short shaft of the valve element carrying the double arm lever 79 previously referred to. The rear end of the bar has a finger member 104 pivotally connected thereto by a pin 105. The free end of this finger carries a pin 106 which is adapted to engage in recess 107 or 108 in the opposed arms of the double arm lever 79 to thereby provide connections for turning the valve element 78 in opposite directions from its central shut-off position shown in Figure 23. The finger is normally biased by a spring 109 to a position wherein it is parallel with the bar 102, said position being shown in Figure 27. In this position pin 106 can be selectively guided into either recess 107 or 108 in a manner to be later referred to. Bar 102 has secured thereto a plate 110 which lies between the bar and the finger, said plate being provided with a V-shaped end 111 which is adapted to cooperate with a V-shaped notch 112 in the back edge of the double arm lever 79. By means of the V-shaped end and the V-shaped notch the valve element will always be returned to its central shut-off position whenever bar 102 assumes the position shown in Figure 27 which is the position causing the suction to be shut off from the engine intake manifold and both chambers of the power cylinder connected to the atmosphere to thus facilitate the neutralizing operations.

Bar 102 is reciprocated by an arm 113 which is yieldably connected to a shaft 114 by a coil spring 115, said spring having one end connected to arm 113 and its other end connected to a member 116 secured to the inner end of shaft 114, which is journaled in the cover member 76. The arm 113 has a sleeve which carries a projection 117 extending into a slot 118 in member 116 to thus accommodate yielding in one direction of rotation only of the shaft if the bar cannot be moved for reasons to become apparent. The end of shaft 114 outside the cover carries a short arm 119 which is adapted to be actuated by the clutch pedal through an arm 120 formed as an extension of the previously mentioned arm 64 movable with the clutch pedal. The arm 120 carries an adjustable pin 121 which engages lever 119 for actuating said arm. A relatively strong coil spring 122 has one end connected to arm 119 and its other end connected to the cover so as to provide spring means for moving the arm and bar 102 to the positions shown in Figures 28 and 29 after being actuated and released by arm 120 which is movable with the clutch pedal.

By means of the structure just described it is seen that when the clutch pedal is depressed to a position beyond clutch-disengaged position there will be a rotation of the shaft 114 and a longitudinal movement of bar 102 from the positions shown in Figures 28 and 29 to the position shown in Figure 27. Upon release of the clutch pedal the spring 122 will return bar 102 to the position shown in Figures 28 and 29.

The selecting means for determining to which arm of the double arm lever 79 finger 104 will be connected when the bar and finger are moved by spring 122 comprises a short shaft 123 mounted in the cover and carrying on its inner end a head 124 provided with a V-shaped surface 125 just lying rearwardly of pin 106 on the finger when the finger is in its inoperative position shown in Figure 27. The apex of this V-shaped surface normally lies in the position shown in Figure 26 when second and high speed ratios are inoperative so that upon movement of bar 102, pin 106 will be guided toward recess 107 in the lower arm of the double arm lever. If the apex of the V-shaped surface 125 should be rotated slightly in a counter-clockwise direction from that shown in Figure 26, it is seen that it will lie in such position as to guide pin 106 into recess 108 of the upper arm of the double arm lever. Thus it is seen that this V-shaped surface on the head of shaft 123 provides a selecting means for determining which arm of the double arm lever will be engaged and moved whenever the bar is moved longitudinally to the left from the position shown in Figure 27. The end of the shaft 123 which projects into the gear casing carries an arm 126 having on its free end a pin 127. A coil spring 128 biases this lever to the position shown in Figures 13 and 14 which causes the V-shaped surface 125 to be in its normal position as shown in Figure 26.

Also journaled in the casing cover 3 along side the shaft 123 is a second shaft 129 which carries on its inner end a locking hook 130 (see Figure 26) which is adapted to hook over the one end of pin 105 by means of which the finger member is pivoted to the bar, thus locking the bar against movement. The end of shaft 129 which projects into the gearing casing has secured thereto a short arm 131 and rotatably mounted on the shaft adjacent this arm is a second longer arm 132, said latter arm being yieldably connected to the short arm by a coil spring 133. There is also provided in surrounding relation to shaft 129, a coil spring 140 which tends to bias the shaft 129 and arm 131 to the position shown in Figure 14, said position being the one corresponding to the unlocked condition of hook 130, as shown in dashed lines in Figure 26.

Arm 126 carried by shaft 123 is adapted to be operated by a projection 141 carried on the lower side of arm 26 in which the shifting fork 25 is mounted. The projection is so arranged that pin 127 on the arm will be engaged and the arm moved only when the shifting fork is moved to the second gear position, which position is shown in Figure 15. As already noted, the movement of this arm 126 will move the V-shaped surface 125 so as to cause pin 106 to ride into recess 108 of the double arm lever.

The arm 132 is adapted to be moved by a master neutralizing lever 142 which is mounted on the inner end of a shaft 143 journaled in the cover plate 3. The outer end of this shaft is provided with an arm 144 which has an open slot 145 in its end. This slot is arranged to cooperate with a pin 146 which is carried by an arm 147 formed as an extension of the previously mentioned arm 30 on the outer end of shaft 24 and controlled by the handle on the steering column. The master neutralizing lever 142 has cooperating with recesses therein, a detent 148 which yieldably holds it in its two operating positions to which it is moved by the handle on the steering column through the connection between arms 144 and 147 just referred to. The master neutralizing lever will be in the position shown in Figure 13 when the handle is in "N" position. The parts on the outside of the casing will then be as shown in Figure 10. If the handle should be moved to the "R" position for manually establishing reverse gear ratio, the pin will merely move away from arm 144 and there will be no movement of the master neutralizing lever 142. However, if the handle should be moved to the "F" position, the pin and slot connection between arms 147 and 144 will result in movement of the master neutralizing lever so that it will assume the position shown in Figures 14, 15, and 16.

The master neutralizing lever carries a pin 149 which is adapted to cooperate with the long arm 132 yieldably connected with shaft 129 which controls the hook to lock the reciprocating bar 102. When the master neutralizing lever is in the full line position shown in Figure 13, which corresponds to neutral position of the gearing, pin 149 will engage arm 132 and so rotate shaft 139 as to place the hook in the locked position shown in Figure 26. When the hook is locked, bar 102 will be in the position shown in Figure 27 having been moved to this position by a disengaging movement of the clutch pedal prior to the "N" setting of the handle. When the master neutralizing lever is moved to its other position shown in Figures 14, 15, and 16 as a result of the handle being put in "F" position, pin 149 will release the arm 132 so that the hook can assume unlocked position shown in dashed lines in Figure 26 thereby freeing bar 102 so that spring 122 can act to move said bar to the position shown in Figures 28 and 29 when the clutch pedal is released.

The upper end of the master neutralizing lever 142 is also provided with a pin 150 which is adapted to cooperate with a bell crank lever 151 pivoted on the inside of the casing closure plate 3. Adjacent this bell crank lever is a second bell crank lever 152 which is so arranged and positioned that when the pin 150 on the neutralizing lever engages and moves the bell crank lever 151, bell crank lever 152 will also be moved. These bell crank levers are constructed and mounted so that the arms thereof can engage opposite sides of the rear end of the mounting pin of shifting fork 25. It will be noted from Figure 14 that when the master neutralizing lever assumes the position shown, which corresponds to the "F" setting of the handle, pin 150 on the lever will not in any way actuate the two bell crank levers 151 and 152 and consequently the shifting fork carrying arm 26 can rotate in either direction from its neutral position to obtain the second and high speed ratios. However, if the master neutralizing lever is moved by the steering column handle to the position shown in full lines in Figure 13, then pin 150 will engage the bell crank lever 151 and so operate both bell crank levers that the gear shifting fork 25 and the double clutch element 21 will be returned to the central or neutral position regardless of which speed ratio was active prior to the moving of the master neutralizing lever to the full line position shown in Figure 13.

There is also provided yieldable detent means for the two gear shifting fork carrying arms so that these arms will be yieldably held in their various positions. This detent means comprises a bar 153 carried on shafts 24 and 27 and provided with a slidable member 154 arranged to project between the two arms 23 and 26 which carry the two gear shifting forks. This member 154 is provided with a bore in which is positioned a spring 155 acting upon two balls 156 and 157 at the ends of the bore. The ball 156 cooperates with three recesses 158 in the arm 23, and ball 157 cooperates with three recesses 159 in arm 26. The three recesses 158 correspond to the neutral, low, and reverse gear positions of the shifting fork 22, and the three recesses 159 correspond to the neutral, second, and high gear positions of the shifting fork 25. The member 154 carries a pin 160 which is engaged by a shoulder 161 on the master neutralizing lever, thus providing stop means for limiting the extent of movement of said lever when handle 56 is moved to "F" position.

Operation

Referring to the operation of the described control mechanism for the change-speed gearing, the various parts thereof will be in the positions shown in Figures 1, 3, 4, 5, 6, 7, 8, 10, 13, 19, 23, 25, 26, 27, and 31 when the handle on the steering column is in the "N" position and the engine clutch is engaged. Under these conditions the distributing valve element 78 will be positioned as shown in Figure 23, wherein the web portion cuts off passage 85, and passages 84 and 86, which are connected to the rear and forward ends, respectively, of the power cylinder are in communication with passage 83 leading to the atmosphere. The valve element will be maintained and locked in this shut off position by the functioning of hook 130 which will be in the position shown in Figure 26. The bar 102 which is being held by the hook will be in the position shown in Figure 27, having been placed there by a prior full disengaging movement of the clutch pedal during neutralizing which will have acted upon arm 119 to pull bar 102 forwardly and free the hook to drop in behind pin 105 under the action of the spring 140 (see Figure 13), it being noted that arm 132 has been operated upon by the master neutralizing lever prior to said disengaging movement of the clutch pedal. In the event the neutralizing lever should be moved to neutralize the gearing prior to full depressing of the clutch pedal, arm 132 will, nevertheless, be operated notwithstanding the hook cannot be moved to locked position because the bar has not been moved sufficiently. This movement of arm 132 is effected by spring 133 connecting arms 132 and 131. The shut-off valve 92 will be in the open position shown in Figure 22 but suction from the manifold cannot reach the ends of the power cylinder due to the distributing valve element being in the shut off position shown in Figure 23, as previously mentioned. In the neutral position of the gearing, the V-shaped selecting surface 125 will be in the position shown in Figure 26 so as to be ready to guide the pin 106 on finger 104 to engage in recess 107 of the lower arm of the double arm lever 79.

If it should be desired to obtain reverse speed ratio, all that need be done is to move the clutch pedal to the extent of its travel and then set the handle 56 in the "R" position. When the clutch pedal is moved, rod 61 will be operated together with sleeve 36, but as soon as the clutch pedal reaches the end of its travel, rod 61 will be disconnected and sleeve 36 returned to the position shown in Figure 19 under the action of spring 49. This will two-way re-clutch sleeve 29 with sleeve 32 so that when handle 56 is moved the shaft 24 will be moved with it and gear 19 meshed with the idler gear.

If low speed ratio is desired, the handle is set in "F" position after the clutch pedal has been fully depressed. The movement of the clutch pedal actuates sleeve 36 but it will be returned when rod 61 is disconnected from the clutch pedal and consequently the sleeves 29 and 32 will be two-way connected together at the time the handle is set in "F" position. This movement of the handle will cause gear 19 to be moved forwardly and establish low speed ratio. When low speed ratio has been established, sleeve 32 will have been moved from the position shown in Figure 19 to a position wherein the square pin 47 is adjacent to but spaced from the end of slot 46 in the sleeve. During the establishing of the reverse and low speed ratios the complete depressing movement of the clutch pedal will have no effect upon moving the distributing valve element 78 since it is locked in the position shown in Figure 23. Also there will be no possibility of any strain being placed upon the parts for operating bar 102 since arm 119, which is engaged by arm 120 and movable with the clutch pedal, is yieldably connected to shaft 114 by spring 115. This spring allows for over run of the clutch pedal after the distributing valve element is closed as shown in Figure 23. When low speed ratio has been engaged by a manual movement of the handle, the master neutralizing lever 142 will be moved to the position shown in Figure 14, and when this position is assumed, hook 130 will be released from its locked position, shown in full lines in Figure 26, to its unlocked position shown in the dashed lines in the same figure. This unlocking of the bar is brought about by the moving of pin 149 on the master neutralizing lever away from arm 132. This releases spring 140 to function to rotate shaft 129 which carries the hook and thus place the hook in unlocked position. The moving of the master neutralizing lever is brought about only when the handle is set at "F," this being accomplished by the pin and slot connection between arms 147 and 144. The positions of the parts on the outside of the casing when the low gear is engaged are shown in Figure 12, this figure also showing the clutch pedal still in its fully depressed position. When the clutch pedal is released to bring about movement of the vehicle, bar 102 and finger 104 will assume the positions shown in Figure 28, having been moved there by spring 122. This will cause the distributing valve element to be moved to connect passages 90 and 91 but passage 91 will not be connected to the manifold since the shut-off valve 92 is in closed condition due to low speed ratio being established. Thus the power cylinder will not be operated.

Should it now be desired to shift to second speed ratio, all that need be done is to fully depress the clutch pedal. It will not be necessary in making the shift from low to second to disturb handle 56 on the steering column as it remains set in "F" position. The depressing of the clutch pedal will result in sleeve 36 being turned in the direction of the arrow shown in Figure 19. The initial turning movement of the sleeve will result in sleeves 29 and 32 being disconnected which disables the two-way clutching connection therebetween so that the one-way clutching connection 46, 47 may be utilized in neutralizing the low speed drive. Following this the square pin 47 on sleeve 36 will engage the end of slot 46 on sleeve 32 and move said sleeve, shaft 24, the shifting fork carrying arm 23, and gear 19. Consequently the gear will be moved out of mesh with the countershaft gear 15 and thus neutralize low speed ratio.

Before gear 19 becomes disengaged, arm 120 will engage arm 119 and as the pedal is continued to be depressed this arm will result in bar 102 being moved from the position shown in Figure 28 to the position shown in Figure 27. This places the distributing valve element in the position shown in Figure 23 where both ends of the power cylinder are cut off. As the clutch pedal is continued to be depressed, the shut-off valve 92 will then be opened. Upon release of the clutch pedal, the strong coil spring 122 will now function to move bar 102 to the left from the position shown in Figure 27 to the position shown in Figure 28. The pin 106 on finger 102 will be caused to again ride into recess 107, being guided there by the position of the V-shaped surface 125 (see Figure 26). As a result of this movement of the bar, the distributing valve element 78 will be turned to a position to connect the forward end of the power cylinder to the inlet manifold 94 of the engine and the rear end of the power cylinder to atmosphere, it being noted that the shut-off valve 92 is now in open position so that the manifold can communicate with the distributing valve. The movement of the piston of the servo-mechanism to the forward end of its cylinder will cause the double clutch element 21 to be moved rearwardly, as viewed in Figure 5, to connect the second speed gear 18 to the driven shaft. This shift is all accomplished before the clutch pedal has been released sufficiently to result in re-engagement of the clutch. As the clutch pedal is continued to be released, the friction clutch will be engaged and the vehicle can be driven in second speed ratio.

When the gearing is in second speed ratio, the distributing valve element 78 will remain in the position to connect the forward end of the power cylinder to the manifold and the parts for controlling the distributing valve element will be in the positions shown in Figure 28. In connection with the controlling of the distributing valve, it is to be particularly noted that it is placed in the position to effect energization of the servo-mechanism during the return movement of the clutch pedal from its fully depressed position and that the actual turning of the valve is brought about by the action of spring 122 and not by any direct mechanical force transmitted from the clutch pedal.

With the gearing set in second speed ratio if it should be desired to obtain high speed ratio or direct drive, this is accomplished by again merely depressing the clutch pedal. The handle on the steering column need not be disturbed from its "F" setting. When the clutch pedal is depressed, the engine driven clutch will be disengaged and arm 120 will rotate arm 119 and move bar 102 forwardly to the position shown in Figure 27, thus placing the distributing valve element 78 back in the position shown in Figure 23. When the clutch pedal is again released, spring 122 will then become active to move bar 102 rearwardly to move the distributing valve element. As the bar moves rearwardly, pin 106 on the finger will be guided into recess 108 in the upper arm of the double arm lever 98, thus establishing such connection between the finger and the double arm lever as to cause the distributing valve element to be set in a position wherein the rear end of the power cylinder is connected to the manifold of the engine and the front end of the power cylinder to atmosphere. The piston of the servo-cylinder will now be moved from the forward end of its cylinder to the rear end and the shift of the double clutch element will take place to establish high speed ratio on direct drive. The reason that pin 106 on the finger will be guided into recess 108 is the new position of the V-shaped selecting surface 125 which has resulted from a counterclockwise rotation of shaft 123 from the position shown in Figure 26. The rotation of the shaft takes place at the time the second speed ratio is established. This will be apparent from viewing the positions of the parts shown in Figure 15, which correspond to the second gear ratio. When the second speed ratio is established, the shifting fork 25 is moved by arm 26 and as this arm rotates, projection 141 thereon will engage pin 127 on arm 126 and give a rotation to the member having the V-shaped surface 125 and place its apex on the lower side of pin 106.

With high speed ratio established the second speed ratio may be re-established at any time by fully depressing the clutch pedal. The establishment of this latter ratio will be brought about in a manner already described since the depressing of the clutch pedal and its release will cause operation of the power cylinder so that the piston will move from the rear end to the forward end of its cylinder. It will be noted also that when high speed ratio was established, the V-shaped selecting surface will have been returned to the position shown in Figure 26 so that when bar 102 is released by the pedal and operated by spring 122, the pin in the finger will ride into recess 107 and thus again place the distributing valve element in a position to bring about the shifting of the gearing from high speed ratio to second speed ratio. In connection with the changing of the V-shaped selecting surface to bring about the re-establishing of second speed ratio, particular attention is called to Figure 16 wherein the parts are shown in positions assumed when high speed ratio is established. It will be noted that under these conditions projection 141 on arm 26 has been moved away from pin 127 so that spring 128 can return the lever to the position where the V-shaped surface is on the upper side of pin 106 and thus is in a position to guide the pin into the proper recess 107.

With the gearing in the second speed ratio, it can again be placed in high speed ratio by merely fully depressing the clutch pedal and then releasing it. Subsequent movements of the clutch pedal to fully disengaged position will result in alternate shifting between second and high speed ratios.

It is also to be noted that with each depressing movement of the clutch pedal there will be no tendency to cause any shifting of gear 19 for each time that the clutch pedal is fully depressed rod 61 will merely rotate sleeve 36 and cause a disengagement of the clutch means between sleeves 29 and 32. Since the end of slot 46 can no longer be engaged by the square pin 47 (one-way clutch connection) as a result of its movement with sleeve 38, there will be no rotation of shaft 24. When the clutch pedal reaches its fully disengaged position, sleeve 38 will always be released by the disconnection of rod 61 from arm 120 which is moved by the clutch pedal.

If it should be desired to neutralize the gearing when it is in either second or high speed ratio, all that need be done is to fully depress the clutch pedal and then move the handle from "F" position to "N" position. With the clutch pedal fully depressed at the time the handle is moved, lever 30 and sleeve 29 moved thereby will be returned to the position shown in Figure 19. Since arm 147 is an integral extension of lever 30, it will be moved from the position shown in Figure 12 to the position shown in Figures 10 and 11. This will rotate the master neutralizing lever 142 and move it from the position shown in Figures 14, 15, and 16 to the position shown in full lines in Figure 13. Such movement will cause the bell crank levers 151 and 152 to be so moved that the gear shifting fork 25, whether in either the high or second speed ratio position, will be returned to neutral position shown in Figure 13, thereby neutralizing the gearing. When the master neutralizing lever is returned to the position shown in full lines in Figure 13, arm 132 will be moved by pin 149, thereby placing hook 130 (Figure 26) in condition to lock bar 102 in the position shown in Figure 27. Upon release of the clutch pedal the parts on the outside of the casing cover will then assume the positions shown in Figure 10. The return of the shifting fork 25 to the neutral position will also result in the return of the piston of the power cylinder to its central position, as shown in Figure 1, this return of the piston being freely accomplished due to both ends of the cylinder being connected to atmosphere.

When the handle is returned to its "N" position and after fully depressing the clutch pedal, the sleeves associated with shaft 24 will assume the positions shown in Figure 19 with the two inner sleeves 29 and 32 two-way re-clutched together by spring 33, it being noted that sleeve 36 is already in the position shown due to rod 61 having been disconnected from arm 64 at the time the clutch pedal reaches the fully-depressed position.

If the gearing should be in low speed ratio and it should be desired to neutralize the gearing, this is also accomplished by depressing the clutch pedal and then setting the handle in "N" position. Under these conditions the mere depression of the clutch pedal will cause the low speed ratio to be neutralized. The pin 47 on sleeve 36 will pick up sleeve 32 and turn shaft 24 to the position where gear 19 will be disengaged in a manner already described in connection with the neutralizing of low speed ratio prior to the engaging of second speed ratio. With the clutch pedal in disengaged position, the moving of the handle to "N" position will now cause a locking of the distributing valve element in its shut off position, as shown in Figure 23. In this neutralizing of low speed ratio it is to be particularly noted that the force which brings about the neutralization is produced by the force acting on the clutch pedal or equivalent member and not by any force transmitted through the mechanism connected with the handle 56.

One of the features to be noted in connection with the control means just described is the arrangement whereby reverse and low gear can be established and neutralized by the handle 56 in the same manner as now done by present totally manual gear-shifting mechanism having a handle on the steering column. If the transmission is in neutral and the clutch pedal has been fully depressed, the combined low and reverse gear 19 may be moved at will either forwardly or backwardly from its neutral position (shown in Figure 5) in the same manner as is done with a conventional manual gear-shifting mechanism.

A feature of the invention which is to be particularly noted is that the driver need only make one setting of the handle 56 for all three forward speed drives. After making this setting, low speed will be manually engaged and thereafter all shifting will be accomplished by merely depressing the clutch pedal and releasing it. Low speed drive will be automatically neutralized and second speed drive established when the clutch pedal is first depressed after the vehicle has been moving in low speed drive. The next depressing of the clutch pedal will result in the establishment of the high speed drive and each subsequent depressing of the clutch pedal will alternately establish second and high speed drives. At any time the operator may neutralize the gearing by merely depressing the clutch pedal and setting the handle in "N" position. Whenever the handle is in this position, the operator will positively know that the gearing is neutralized. The neutralizing of the transmission is accomplished by the operator's hand when the gearing is in low, second or high speed drives, and by the operator's foot when the gearing is in reverse or low speed drive only. If the low speed ratio should be desired when the gearing is in either high or second speed drive, all that need be done is to depress the clutch pedal and then move the handle to "N" position and subsequently place it in "F" position. This neutralizes the gearing and then results in gear 19 being meshed with gear 15.

*Modified distributing valve control and operation*

Figure 38:
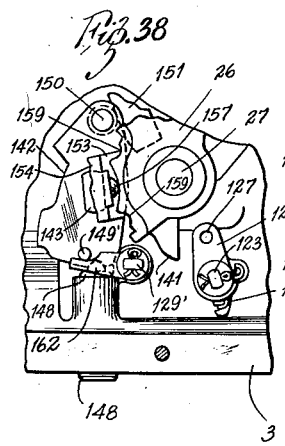
Figure 38 is a view showing a modified mechanism for shutting off the power cylinder control valve when the hand control lever is moved to its neutral position, said view showing the parts in positions corresponding to neutral condition of the gearing with the valve in shut-off position.
Figure 39:
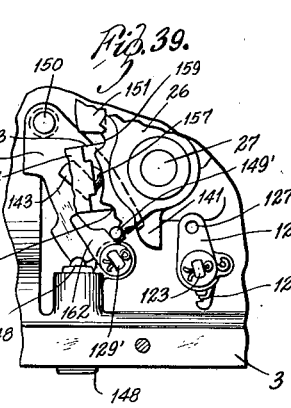
Figure 39 is a view similar to Figure 38 but showing the parts in positions assumed when the hand-lever at the steering wheel is moved to "F" position.
Figure 40:
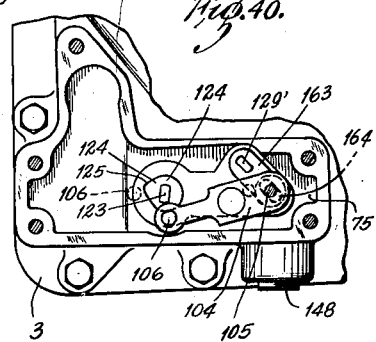
Figure 40 is a view of the parts of the modified mechanism which are on the outside of the cover plate.

In Figures 38, 39, and 40 there is shown a modified construction which is employed to take the place of the hook-lock arrangement 130 shown in the control mechanism just described. Similar parts are designated by the same reference numerals which are used in describing the control mechanism shown in the previous figures. In place of the small shaft 129, which carries hook 130, shown in Figure 26, there is substituted a short shaft 129'. The inner end of this shaft carries an arm 162 which is arranged to cooperate with a pin 149' carried by the master neutralizing lever 142, said pin 149' replacing the previously referred to pin 149. The end of shaft 129' which extends into chamber 75 has secured thereto an arm 163 which is provided adjacent to its free end with a slot 164 for receiving pin 105 carried by bar 102, said pin 105 also being the one employed to pivot finger 104 to the bar.

With this modified construction arm 162 will be positively moved by pin 149 on the master neutralizing lever to the position shown in Figure 38 during the idle movement of the master neutralizing lever before engaging the neutralizing lever 151 in the manner previously described to neutralize the gearing, that is, when the handle is set in "N" position. This will result in arm 163 being held in a position where-in finger 104 will be in the position coextensive with bar 102 and thus the bar and the finger cannot be moved to change the distributing valve element from its shut off position, as shown in Figure 26. When the hand-lever 56 is set in the "F" position, the master neutralizing lever will assume the position shown in Figure 39. Under these conditions pin 149' will move away from arm 162 to thus free the bar to be under the control of the clutch pedal and spring 122 so that finger 104 can selectively operate the distributing valve to its open positions in the manner already described.

*Modified control mechanism and operation*

Referring to Figures 41 to 53, inclusive, a modified control mechanism will be described, said control mechanism being arranged to be under the control of the operator by both the clutch pedal and the accelerator mechanism for the vehicle engine. The accelerator mechanism is shown in Figure 41 and comprises an accelerator pedal 165 connected by a rod 166 with a three-armed lever 167 pivoted on the engine. The rod 165 is connected to lever arm 168. Another arm 169 is connected by a rod 170 to the carburetor valve (not shown) and the third arm 171 is connected by a rod 172 with the control mechanism for the gearing. In this modified gearing control mechanism, much of the structure is the same as that first described and shown in Figures 1–37 inclusively. Thus like structure is designated by similar reference numerals as previously used.

The distributing valve structure in this modification remains the same as that of the first embodiment comprising the valve element 78 carrying the double arm lever 79. The power cylinder 71 is connected to this distributing valve in the manner already described. The structure associated with shaft 24 and its connection with the handle and clutch pedal is the same as is also the neutralizing mechanism.

In addition to a slightly modified shut-off valve 92' there are provided two shut-off valves 173 and 174. The shut-off valve 173 is arranged to be controlled by an arm 120' movable with the clutch pedal, and the shut-off valve 174 is arranged to be controlled by an arm 175 formed as an integral extension on arm 144 which is on the outer end of the master neutralizing lever shaft 150. A conduit 176 leads from the shut-off valve 92' to the shut-off valve 174, and a second conduit 177 leads from the shut-off valve 174 to the shut-off valve 173, this latter valve being connected to conduit 93' which leads to the manifold 94 of the engine.

The shut-off valve 92', which is controlled by arm 23 employed in shifting the combined low and reverse gear 19, is modified over the previously described shut-off valve 92 only in the arrangement of its slot 101' in valve element 100, said parts being shown in Figures 51, 52, and 53. Figure 51 shows the shut-off valve open, a condition which exists when the gearing is in neutral. Figures 52 and 53 shows the shut-off valve in its two closed positions which correspond to the low and reverse speed ratio conditions, respectively, of the gearing.

The shut-off valve 174 is provided with a cylindrical valve element 178 which is rotated by an arm 179 when said arm is engaged by the previously referred to arm 175 controlled by the handle on the steering column. A spring 180 acts on arm 179 to bias the valve element 178 to a predetermined closed position as determined by the stop pin shown. The rotatable valve element 178 is provided with an annular groove 181 whereby it can disconnect conduit 176 from conduit 177 and place conduit 176 in communication with the atmosphere through a port 182 in the valve casing 183. The connection of conduit 176 to atmosphere takes place when the gearing is in the neutral condition, as shown in Figure 49. When the handle on the steering column is set in "F" position, lever 175 will be rotated so as a pin 175' carried thereby will engage arm 179 and rotate the valve element to the position wherein conduits 176 and 177 are in communication with each other.

The valve 173 is mounted in the cover plate 76' on the forward end of the gear casing cover 3' and comprises a rotatable valve element 184 positioned in a bore 185 in said cover plate. The outer end of this valve element has secured thereto a short arm 186 which is adapted to be engaged by the clutch pedal operated arm 120' to rotate the valve element whenever the clutch pedal is fully depressed. The arm 186 is provided with an arcuate slot 187 in which is positioned a pin 188 carried by the cover plate. This pin and slot arrangement limits the extent of rotation of the arm in opposite directions. The valve element is provided with an arcuate groove 189 in its surface, said groove extending substantially three-fourths of the way around the valve element. This groove is arranged to provide communication between conduits 177 and 93' when the valve is in one position and to cut off said communication when the valve element is in another position. Communication is established when arm 186 is actuated by the clutch pedal to the position shown in Figure 48, and communication is cut off when the clutch pedal is in engaged position. The cut off position is shown in Figure 42.

Extending through the valve element 184 is a shaft 190 and on the outer end of this shaft beyond the clutch pedal operated arm 186 is an arm 191 to which the previously referred to rod 172, which is operated by the accelerator pedal, is attached. The inner end of shaft 190 has secured thereto an arm 113' which is substantially the same arm as arm 113 employed in the previously described control mechanism. This arm 113' controls bar 102' to which finger 104' is pivoted by means of pin 105'. The finger carries the pin 106' on its free end by which the finger actuates the double arm lever 79 and the distributing valve element 78. The finger is biased to a coextensive position with the bar by a hairpin spring 109', the ends of said spring cooperating with a pin 192 carried by the finger. A second pin 193 holds the hairpin spring in position.

The selecting means for determining to which arm of the double arm lever the pin 106' of the finger will be guided comprises the shaft 123 employed in the first described control mechanism. This shaft is provided with a head 124' having a V-shaped surface 125'. The head 124' carries two spaced ears 194 and 195 opposite the V-shaped surface and positioned between these ears is a pin 196 for determining two positions of the V-shaped surface. The shaft 123 is normally biased to the position shown in Figure 43 by the same structure employed in the first described control mechanism, said structure comprising arm 126 positioned inside the cover plate 3' and a spring 128, said arm 126 being operated by the projection 141 on arm 26 of the gear shifting fork 25.

Referring to the operation of the modified construction shown in Figures 41–53 inclusively, when the gearing is in neutral condition the parts will be in the positions shown in Figure 41. This figure also shows the released position of the accelerator pedal and also the released or clutch-engaged position of the clutch pedal. Under these conditions the shut-off valve 173 will be in closed position as shown in Figure 42. The shut-off valve 174 will also be in closed position, as shown in Figure 49, that is, in a position to connect conduit 176 to atmosphere. The shut-off valve 92' will be in a position to connect conduit 176 with conduit 91 leading to the distributor valve means, said position shown in Figure 42. Since the shut-off valve 173 is closed, the power cylinder cannot be operated as communication with the manifold of the engine is cut off. With the accelerator pedal in released position, bar 102' and finger 104' will be in the positions shown in Figure 46, it being noted with respect to finger 104' that pin 106' thereof will be guided into recess 107 of the double arm lever to thus cause the distributing valve element 78 to be in the position shown in Figure 8. This results from the V-shaped recess 125' being in the position shown in Figure 43 due to the neutralized condition of the gearing.

Reverse and low speed ratios can be established in the manner already described with respect to the first embodiment of the control mechanism shown in Figures 1–37 inclusively. Whenever low or reverse speed is established, the shut-off valve 92' will be closed, preventing operation of the power cylinder notwithstanding opening of shut-off valve 173 by the clutch pedal during shifting operations.

If it is considered that low speed ratio has been established by fully depressing the clutch pedal and setting the handle on the steering column in "F" position and the vehicle is being driven forward after release of the clutch pedal, second speed ratio can be established by merely releasing the accelerator pedal and subsequently fully depressing the clutch pedal. When the accelerator pedal is released, the distributing valve element 78 will assume the position shown in Figure 42 due to the position of the selecting V-shaped surface 125'. As the clutch pedal is depressed after release of the accelerator mechanism, gear 19, shown in Figure 5, will be disengaged from gear 15 in a manner already described and then the shut-off valve 173 operated as a result of arm 120' engaging arm 186 of the shut-off valve. This will place the valve element 184 in the position shown in Figure 48 wherein conduit 93 can communicate with conduit 177.

Since the handle is in "F" position, the shut-off valve 174 will have the condition shown in Figure 50 which will place conduit 177 in communication with conduit 176. After the low gear ratio is neutralized, the shut-off valve element 92' will assume open position, as shown in Figure 51. Thus it is seen that upon the opening of valve 173 by the clutch pedal, there will be established communication between the engine inlet manifold 94 and the forward end of the power cylinder, thus causing the piston of the power cylinder to be moved and second speed ratio established. When the clutch pedal is released to drive the vehicle forward, the shut-off valve 173 will be closed so that communication is cut off between the power cylinder and the manifold. Establishment of second speed ratio will set the V-shaped selecting surface 125' in the position shown in dotted lines in Figure 43. As the vehicle is driven forwardly by a depressing of the accelerator pedal and a speeding up of the engine, the bar 102' will be moved to the right to the position shown in Figure 46 and finger 104' will be caused to be connected to the upper arm of the double arm lever 79. Whenever the accelerator pedal is next released, the double arm lever 79 will be moved to the position shown in Figure 47, thereby positioning the distributing valve element 78 to place the rear end of the power cylinder in communication with conduit 91.

If, after driving in second speed ratio, it is desired to obtain high speed ratio, this is accomplished by merely releasing the accelerator pedal and fully depressing the clutch pedal. In depressing the clutch pedal the valve 173 will be opened and there will be communication between the inlet manifold of the engine and the rear end of the power cylinder, which will cause the piston to be moved rearwardly and the double clutch element 21 of the gearing moved forwardly to neutralize second speed ratio and connect the driving and driven shafts to establish high speed ratio or direct drive. The establishing of high speed ratio will result in the V-shaped selecting surface 125 being placed in the full line position in Figure 43. When the clutch pedal is released to drive the vehicle forwardly, the shut-off valve 173 will be re-closed. Upon depressing the accelerator pedal to speed up the engine, the bar 102' will again be moved forwardly so that the finger 106 will be guided into recess 107 of the lower arm of the double arm lever 79. Whenever the accelerator pedal is released the distributing valve element 78 will again be placed in the position shown in Figure 42 so that the forward end of the power cylinder will be connected to communicate with conduit 177 leading to the shut-off valve 173.

When the gearing is in high speed ratio, it can be changed to second speed ratio whenever desired by merely releasing the accelerator pedal and then fully depressing the clutch pedal which operation energizes the servo-mechanism to effect the desired speed change. High speed ratio can again be obtained at will by performing the same operations. Thus it is seen that once the gearing has been placed in high speed ratio, then second and high speed drives may be alternately obtained whenever the accelerator pedal is released and the clutch pedal depressed. In connection with the alternate shifting of the gearing between second and high speed ratio, it is to be particularly noted that it can also be accomplished as desired whenever the clutch pedal is fully depressed. In other words, with the clutch pedal fully depressed, second and high speed ratios may be alternately obtained by successively depressing and releasing the accelerator pedal. Thus it is seen that there will be no necessity for moving the clutch out of and into engagement each time a gear shift is desired. If, for example, the gearing should be in high speed ratio, and the operator should desire second speed ratio all that need be done is to release the clutch pedal and press the accelerator pedal. If the operator should have a change of mind and finally conclude that high is the proper speed ratio even with second speed ratio engaged after he has depressed the clutch pedal, all he needs do is to again sufficiently depress the accelerator pedal to cause the finger to change connections with the double arm lever 79. It will not be necessary for him to release and re-depress the clutch pedal as the shift will be accomplished by merely operating the accelerator pedal, it being noted that whenever the clutch pedal is held fully depressed, valve 173 is always open and, therefore, alternate depressing and releasing of the accelerator will change the distributing valve element 78 back and forth to its two servo-energizing positions.

The gearing is neutralized in the same manner as in the first described control mechanism. All that need be done is to fully depress the clutch pedal and return the handle to "N" position. This return of the handle will cause the shut-off valve 174 to be placed in the position shown in Figure 49 wherein conduit 176 is in communication with the atmosphere. Thus, irrespective of the position of the distributing valve, both ends of the power cylinder will now be connected to atmosphere and the return movement of the handle to "N" position will not be resisted by air trapped on either side of the piston of the power cylinder.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

I claim as my invention:

1. In a control mechanism for a change-speed gearing having three forward speed ratio means, means comprising a manually controlled member for establishing one of the speed ratio means by manual effort when moved from one position and set in a second position, an actuatable member, actuating means for said last-named member, means operable by said actuatable member for neutralizing the established one speed ratio means when actuated and without disturbing the second position setting of the manually-controlled member, means comprising power means for alternately establishing the remaining two speed ratio means, and means for controlling the operation of the power means by the said actuatable member to cause the alternate establishment of the said remaining two speed ratio means.

2. In a control mechanism for a change speed gearing having three forward speed ratio means, means comprising an operator-controlled member for establishing one of the speed ratio means by operator effort when moved from one position and set in a second position, a second operator-controlled member, means operable by said second operator-controlled member for neutralizing the established one speed ratio means and without disturbing the second position setting of the first operator-controlled member, means comprising power means for alternately establishing the remaining two speed ratio means, a third operator-controlled member, and means for controlling the operation of the power means by the second and third operator-controlled members to bring about the alternate establishment of the said remaining two speed ratio means.

3. In a control mechanism for a change speed gearing having three forward speed ratio means, means comprising an operator-controlled member for establishing one of the speed ratio means by operator effort when moved from one position and set in a second position, a second operator-contrlled member, means operable by said second operator-controlled member for neutralizing the established one speed ratio means and without disturbing the second position setting of the first operator-controlled member, means comprising power means for alternately establishing the remaining two speed ratio means, control means including said second operator-controlled member for controlling the operation of the power means to bring about the alternate establishment of the remaining two speed ratio means after said first speed ratio has been neutralized, and means for neutralizing either of said remaining speed ratio means at will by operator effort when the first operator-controlled member is returned to its first position.

4. In a control mechanism for a change speed gearing having three forward speed ratio means, means comprising an operator-controlled member for establishing one of the speed ratio means by operator effort when moved from one position and set in a second position, means for neutralizing said one speed ratio means by operator effort and without disturbing the second position setting of the operator-controlled member, and means comprising operator-controlled means for alternately establishing the remaining two speed ratio means after said first speed ratio means has been neutralized.

5. In a control mechanism for a change speed gearing having three forward speed ratio means, means comprising an operator-controlled member for establishing one of the speed ratio means by operator effort when moved from one position and set in a second position, means for neutralizing said one speed ratio means by operator effort and without disturbing the second position setting of the operator-controlled member, means comprising operator-controlled means for alternately establishing the remaining two speed ratio means after said first speed ratio has been neutralized, and means for neutralizing either of said remaining speed ratio means at will by operator effort when the first operator-controlled member is returned to its first position.

6. In a control mechanism for a change speed gearing having three forward speed ratio means and being associated with a friction clutch and an operator-operated control member therefor, an operator-controlled member for establishing one speed ratio means by operator effort, means for manually neutralizing by operator effort said speed ratio means by operation of the control member for the clutch, means including power means for alternately establishing the other speed ratio means, and means for controlling the last-named means by the control member for the clutch.

7. In a control mechanism for a change-speed gearing having three forward speed ratio means and being associated with a drive torque transmitting clutch provided with a control member, means comprising a manually-controlled member movable from one position and set in a second position for establishing one of the speed ratio means solely by operator effort, means operable solely by the clutch control member when moved beyond clutch disengaging position for neutralizing by operator effort the established one speed ratio means, means comprising power means for alternately establishing the remaining two speed ratio means, a pedally-controlled member, and means for controlling the power means by operation of the clutch control member and the pedally-controlled member to cause the alternate establishment of the said two remaining speed ratio means after the first speed ratio means is neutralized by operating the clutch control member in the manner aforestated with the manually-controlled member in its second position setting.

8. In a control mechanism for a change speed gearing having three forward speed ratio means, means comprising an operator-controlled member for establishing one of the speed ratio means by operator effort when moved from one position and set in a second position, a second operator-controlled member for neutralizing the established one speed ratio means and without disturbing the second position setting of the first operator-controlled member, means comprising power means for alternately establishing the two remaining speed ratio means, control means for the power means including a third operator-controlled member, means operable by the second operator-controlled member for conditioning the power means for operation by its control means.

9. In a control mechanism for a change speed gearing having three forward speed ratio means, means comprising an operator-controlled member for establishing one of the speed ratio means by operator effort when moved from one position and set in a second position, a second operator-controlled member for neutralizing the established one speed ratio means by operator effort and without disturbing the second position setting of the first operator-controlled member, a source of fluid pressure different from atmosphere, a double acting fluid motor connected to alternately establish the remaining two speed ratio means, conduit means between the source and both ends of the fluid motor, a control valve for the conduit means, and means so operating the control valve at will by the second operator-controlled member as to bring about the alternate establishment of the said remaining two speed ratio means after the first speed ratio means has been neutralized.

10. In a control mechanism for a change speed gearing having three forward speed ratio means and being associated with an engine provided with an accelerator mechanism, means comprising an operator-controlled member for establishing one of the speed ratio means by operator effort when moved from one position and set in a second position, a second operator-controlled member, means operable by the second operator-controlled member for neutralizing the established one speed ratio means without disturbing the second position setting of the first operator-controlled member, means comprising power means for alternately establishing the remaining two speed ratio means, and means for controlling the power means at will by operation of the second operator-controlled member and the accelerator mechanism to bring about the alternate establishment of the said two remaining speed ratio means after the first speed ratio means is neutralized.

11. In a control mechanism for a change speed gearing having three forward speed ratio means, means comprising an operator-controlled member for establishing one of the speed ratio means by operator effort when moved from one position and set in a second position, a second operator-controlled member for neutralizing the established one speed ratio means by operator effort and without disturbing the second position setting of the first operator-controlled member, a source of fluid pressure different from atmosphere, a double acting fluid motor connected to alternately establish the remaining two speed ratio means, conduit means between the source and both ends of the fluid motor, a control valve for the conduit means having two operative positions, selecting means controlled by the establishment of the two remaining speed ratio means for selecting the position to which the valve is moved, and means for operating the control valve at will by the second operator-controlled member after the first speed ratio means has been neutralized.

12. In a control mechanism for a change speed gearing having three forward speed ratio means and being associated with an engine provided with an accelerator mechanism, means comprising an operator-controlled member for establishing one of the speed ratio means by operator effort when moved from one position and set in a second position, means for neutralizing the said one speed ratio means without disturbing the second position setting of the operator-controlled member, power means for alternately establishing the remaining two speed ratio means, and control means for the power means including means operated by operation of the accelerator mechanism.

13. In a control mechanism for a change speed gearing having three forward speed ratio means and being associated with an engine provided with an accelerator mechanism, means comprising an operator-controlled member for establishing one of the speed ratio means by operator effort when moved from one position and set in a second position, means for neutralizing the said one speed ratio means without disturbing the second position setting of the operator-controlled member, a source of fluid pressure different from atmosphere, a fluid motor connected to alternately establish the two remaining speed ratio means, a control valve having two operative positions, selecting means controlled by the operative condition of the remaining two speed ratio means for determining to which position the control valve is to be moved, and means for moving the control valve to the selected position by operation of the accelerator mechanism.

14. In a control mechanism for a change speed gearing having three forward speed ratio means and being associated with an engine provided with an accelerator mechanism and with a friction clutch provided with a control member, means comprising an operator-controlled member for establishing one of the speed ratio means by operator effort when moved from one position and set in a second position, means operable by the clutch control member when moved beyond clutch disengaging position for neutralizing the established one speed ratio means without disturbing the second position setting of the first operator-controlled member, a source of fluid pressure different from atmosphere, a fluid motor connected to alternately establish the remaining two speed ratio means, conduit means between the motor and source, a control valve having two operative positions, selecting means controlled by the establishment of the said two remaining speed ratio means and determining the positioning of the valve when operated, means for operating the valve by operation of the accelerator mechanism, and shut-off valve means for preventing the motor from communicating with the source when the clutch is engaged.

15. In a control mechanism for a change speed gearing having three forward speed ratio means and being associated with an engine provided with an accelerator mechanism, means comprising an operator-controlled member for establishing one of the speed ratio means by operator effort when moved from one position and set in a second position, means for neutralizing the said one speed ratio means without disturbing the second position setting of the operator-controlled member, a source of fluid pressure different from atmosphere, a fluid motor connected to alternately establish the remaining two speed ratio means, conduit means between the opposite ends of the fluid motor and the source, a control valve for the conduit means having two operative positions, means for moving the control valve to its two positions by operation of the accelerator mechanism, means controlled by the established speed ratio means of the said remaining two speed ratio means for determining to which position the valve will be placed by the accelerator mechanism, a shut-off valve between the control valve and the source, and means for controlling the shut-off valve so as to be open when the said one speed ratio means is in neutral condition and to be closed when said one speed ratio means is established.

16. In a control mechanism for a change speed gearing having three forward speed ratio means, means comprising an operator-controlled member for establishing one speed ratio means when moved from one position and set in a second position, means for neutralizing the one speed ratio means without disturbing the second position setting of the operator-controlled member, a source of fluid pressure different from atmosphere, a double acting fluid motor connected to alternately establish the two remaining speed ratio means, conduit means between the source and motor, a control valve for the conduit means, means for controlling the control valve to bring about the alternate establishment of the said two speed ratio means, means for neutralizing at will either of the said two remaining speed ratio means by returning the operator-controlled member to its first position, and valve means for insuring the venting of both ends of the power cylinder to atmosphere upon initial movement of the operator-controlled member from the second position during neutralizing.

17. In a control mechanism for neutralizable change speed gearing, means comprising an operator-controlled member for operating the gearing to establish a speed ratio by operator effort when moved from one position and set in a second position, a second operator-controlled member for neutralizing the said gearing by operator effort, and said neutralizing member being operable independently of the first member so that the neutralizing can be effected without disturbing the second position setting of the first operator-controlled member, and means functioning to accommodate subsequent operations of the second member without disturbing the said neutralized condition of the gearing or the second position setting of the first member.

18. In a control mechanism for a change speed gearing having a shiftable element and being associated with a friction clutch provided with a control lever, means comprising an operator-controlled member for moving the shiftable element and operating the gearing to establish a speed ratio by operator effort when moved from one position and set in a second position, connecting means between the clutch lever, the operator-controlled member and the shiftable element enabling neutralization of the gearing to disestablish the speed ratio by a clutch disengaging movement of the clutch lever and without disturbing the second position setting of the operator-controlled member, and means operable independently of the first member embodied in the connecting means for enabling subsequent clutch disengaging movements of the clutch lever without disturbing the said neutral condition of the gearing or the second position setting of the said first member.

19. In a control mechanism for a change speed gearing having a shiftable element and being associated with a friction clutch provided with a control lever, means comprising an operator-controlled member for moving the shiftable element and operating the gearing to establish a speed ratio by operator effort when moved from one position and set in a second position, and connecting means between the clutch lever, the operator-controlled member and the shiftable element independent of the operator controlled member, enabling neutralization of the gearing by a clutch disengaging movement of the clutch lever and without disturbing the second position setting of the operator-controlled member, said connecting means embodying a clutch means between the operator-controlled member and the element, means for disengaging the clutch means by operation of the lever and means for establishing a connection between the lever and element after the clutch means is disengaged.

20. In a control mechanism for a change speed gearing having a rotatable shaft for controlling the operation of the gearing to establish a speed ratio, an operator-operated member, a connection between the member and shaft including clutch means for rotating the shaft to operate the gearing to establish the speed ratio when the member is moved from one position and set in a second position, a lever, means establishing a connection between the lever and shaft when the shaft is in the speed ratio established position of the gearing to thereby enable neutralization of the gearing by movement of the lever, and means for disengaging the clutch means when the lever is moved and prior to the said neutralizing of the gearing.

21. In a control mechanism for a change speed gearing having a rotatable shaft for controlling the operation of the gearing to establish a speed ratio, an operator-operated member, a connection between the member and shaft including clutch means for rotating of the shaft to operate the gearing to establish the speed ratio when the member is moved from one position and set in a second position, a lever, means establishing a connection between the lever and shaft when the shaft is in the speed ratio established position of the gearing to thereby enable neutralization of the gearing by movement of the lever, means for disengaging the clutch means when the lever is moved and prior to the said neutralizing of the gearing, and means for maintaining the clutch means disengaged while the said member is in its second position setting.

22. In a control mechanism for a change speed gearing having two speed ratios, power means having a movable element for operating the gearing to alternately establish the speed ratios by a movement to two different positions, a control means for the power means including an element movable to two operative positions, an operator-operated member for the element of the control means, selecting means for determining to which position the control element will be moved, a second operator-operated member, means operable by the second operator-operated member for neutralizing the gearing to disestablish either speed ratio at will by manual effort, and other means operable by the second operator-operated member for preventing the element of the control means from being controlled by the first operator-operated member when the gearing is neutralized as aforesaid by said second member.

23. In a control mechanism for a change-speed gearing having two different gear drives; a power cylinder having a movable element for operating the gearing to establish the two gear drives, the gearing being established in one of said gear drives when the element is moved to one end of the cylinder and the other gear drive being established when the element is moved to the other end of the cylinder; a source of fluid pressure different from atmosphere; means comprising a valve for connecting the source with the power cylinder and atmosphere, said valve having a shut-off position wherein the source is disconnected from both ends of the power cylinder and said ends are connected with atmosphere; pedally controlled means operably connected to the valve for causing the valve to be placed in its various operative and shut-off positions; other pedally-controlled means operable for neutralizing the gearing to disestablish either gear drive; and means controlled by the last named-controlled means when the gearing is thus neutralized thereby for preventing the said valve means from being controlled by the first-named controlled means.

24. In a control mechanism for a change speed gearing having two speed ratios, a power cylinder having a movable element for operating the gearing to establish the two speed ratios, the gearing establishing one of said speed ratios when the element is moved to one end of the cylinder and establishing the other speed ratio when the element is moved to the other end of the cylinder; a source of fluid pressure different from atmosphere, means comprising a valve for connecting the source with the power cylinder and atmosphere; said valve having a shut-off position wherein the source is disconnected from both ends of the power cylinder and said ends are connected with atmosphere; operator-controlled means connected to the valve for causing the valve to be placed in its various operative and shut-off positions; other operator-controlled means for neutralizing the gearing to disestablish either speed ratio at will by manual effort; means controlled by the last operator-controlled means when the gearing is thus neutralized for locking said valve in its shut-off position, and yieldable means associated with the connection between the valve and the first operator-controlled means to accommodate operation of the latter when the locking means is operative.

25. In a control mechanism for a change speed gearing having two forward speed ratios and being associated with an engine having an accelerator mechanism and a friction clutch having a clutch control member, a double acting fluid motor for operating the gearing to alternately establish either of the two speed ratios, a source of fluid pressure different from atmosphere, conduit means between the source and the fluid motor, a selector control valve, a shut-off valve, means for opening the shut-off valve when the clutch is disengaged by its control member; means for operating the selector valve by the accelerator mechanism, selecting means for determining the conditioning of the selector valve by the accelerator mechanism, said selecting means being controlled in accordance with the speed ratio established by the gearing, operator-operated means for neutralizing the gearing to disestablish either speed ratio at will and by operator effort, and valve means controlled by the operator-operated means for controlling the conduit means coming from the control valve to the source so as to be in communication with the atmosphere when the gearing is thus neutralized.

26. In a control for a change speed transmission used with a torque transmitting means operated from a torque transmitting condition through a torque releasing actuation, the transmission including three forward speed ratios, the combination of a first member movable from a first position to a second position and mechanism operated thereby to actuate the first speed ratio means, to establish first speed ratio, power mechanism to effectuate second and third speed ratio means including power means, selector means to select between second and third speed ratio means, and means operated upon operation of the torque transmitting means in its torque releasing actuation to render the power means operative to operate the selected ratio means, and mechanism independent of the operation of the power means in effecting operation of the second and third speed ratio means, to neutralize the first speed ratio means, and means coordinating operation of the neutralizing means with operation of the torque transmitting means in its torque releasing actuation.

27. In a control for a change-speed transmission used with a torque transmitting means operated from a torque transmitting condition through a torque interrupting releasing actuation, the transmission including at least three forward speed ratio means, the combination of a first member movable from a first position to a second position to establish first speed ratio means, means operated upon operation of the torque transmitting means in the direction for torque interruption, to neutralize first speed ratio means, power mechanism to effectuate the second and third speed ratio means including power means, selector means to select between second and third speed ratio means, and means operated upon operation of the torque transmitting means in the direction to restore it to torque transmitting condition, to render the power means operative to effectuate the selected ratio means.

28. In a control for a change-speed transmission used with a torque transmitting means operated from a torque transmitting condition through a torque interrupting actuation, the transmission including at least three forward speed drives, the combination of a first member movable from a first position to a second position to establish first speed drive means, means operated upon operation of the torque transmitting means in the direction for torque interruption, to neutralize first speed drive means, power mechanism to effectuate the second and third speed drives including power means, selector means to select between second and third speed drives, control means operated coordinately with operation of the torque transmitting means in its torque interrupting actuation to cause the power means to effect the selected speed drive, and means in said control means to time the effectuating of the selected speed drive by the power means to occur prior to restoration of the torque transmitting condition of the torque transmitting means by operation of its operating means.

29. In a control for a change speed transmission used with a clutch mechanism operated into clutching and declutching positions, said transmission having three forward speed ratio means, the combination of a first member movable from first to second position to establish first speed ratio means, power mechanism to effectuate second and third speed ratio means, including power means, selector means to select between second and third speed ratio means, a clutch operated member for actuation by the clutch mechanism, to be moved when the clutch mechanism operates into declutching position, and control means to control energization of the power means, said control means being operated by movement of the clutch operated member, to effectuate the selected one of second and third speed ratio means, means independent of the power means to neutralize first speed ratio means prior to effecting second and third speed ratio means, and means coordinating said independent means with the operation of the clutch mechanism.

30. In a control for a change speed transmission having three forward speed ratio means, the combination of a first member movable from first to second position to establish first speed ratio means, power mechanism to establish second and third speed ratio means, including power means, selector means to select between the second and third ratio means, a first externally controllable mechanism to regulate operation of the power means to cause the same to effectuate the speed ratio means selected by the selector means, a second externally controllable mechanism to permit operation of the power means only when the second mechanism is externally operated, means connected with the first member to prevent operation of the power mechanism when the first member is in first position, and means to prevent operation of the power mechanism when the first speed ratio means is established.

31. In a control for a change speed transmission having three forward speed ratio means, the combination of a first member movable from first to second position to establish first speed ratio means, power mechanism to establish second and third speed ratio means, including power means, selector means to select between the second and third ratio means, a first externally controllable mechanism to regulate operation of the power means to cause the same to effectuate the speed ratio means selected by the selector means, a second externally controllable mechanism to permit operation of the power means only when the second mechanism is externally operated, means connected with the first member to prevent operation of the power mechanism when the first member is in first position, means to prevent operation of the power mechanism when the first speed ratio means is established, and means coordinated with the second mechanism to neutralize first speed ratio means prior to effectuation of the second and third ratio means.

32. In a control for a change speed transmission, having three forward speed ratio means, employed with a torque transmitting means operable in a torque transmitting and torque relieving actuation, the combination of means to establish first speed ratio means including a first member movable from first to second position, neutralizing means for operation coordinately with operation of the torque transmitting means into torque relieving condition to neutralize said first speed ratio means, said means being deactuated prior to return of the torque transmitting means to torque transmitting condition, whereby first speed ratio means may be rendered effective when torque is relieved, power mechanism for effectuating the second and third ratio means, means to prevent effectuation of the second and means is established, and means dependent upon third speed ratio means when first speed ratio neutralizing of the first speed ratio means by said neutralizing means aforesaid, to render the power mechanism effective.

33. In a control for a change speed transmission used with torque relieving and torque transmitting means having three forward speed ratio means, means to establish first speed ratio means, power mechanism to establish the second and third speed ratio means, control mechanism for connection with the torque transmitting means for operation therewith from a first condition corresponding to torque transmission to a second condition corresponding to torque relief, and means dependent upon establishment of first speed ratio means and operation of said control mechanism from first to second condition after establishment of first speed ratio means, to render the power mechanism operative.

34. In a control for a change speed transmission having at least three forward speed ratio means operable with torque transmitting means operable in a torque transmitting and a torque relieving actuation, the combination of means to establish the first speed ratio means, power operated means to establish the second and third speed ratio means, control mechanism connectable with the torque transmitting means for operation into a first condition corresponding to torque transmission, and into a second condition corresponding to torque relief, means moved from a first to a second position by operation of the control mechanism from first to second condition, means releasing the moved means and returning it to first position after it reaches second position, said releasing means being independent of return of the control mechanism to first condition, and means operated by the moved means in its movement from its first to its second position to render the power operated means operable.

35. In a control for a change speed transmission having at least three forward speed ratio means operable with torque transmitting means operable in a torque transmitting and a torque relieving actuation, the combination of means to establish the first speed ratio means, power operated means to establish the second and third speed ratio means, control mechanism connectable with the torque transmitting means for operation into a first condition corresponding to torque transmission, and into a second condition corresponding to torque relief, means moved from a first to a second position by operation of the control mechanism from first to second condition, means releasing the moved means and returning it to first position after it reaches second position, said releasing means being independent of return of the control mechanism to first condition, means operated by the moved means in its movement from its first to its second position to render the power operated means operable, and means connected with the moved means to neutralize the first speed ratio means when the moved means moves from first to second position.

36. In a device for use in changing the speed ratios of a variable speed transmission having two speed ratio means, means including a first rotatable member rotatable from a first to a second angular position, a second rotatable member for connection with the first speed ratio means, a first, axially separable clutch means for connecting the first and second members whereby when the first member is rotated from first to second position, the first speed ratio means will be established, a third rotatable member rotatable relatively to the first, a lost motion clutch means between the third and second members permitting rotation of the second to establish the first speed ratio means, without moving the third member, means on the third member to separate the first clutch means upon initial movement of the third member, and said lost motion clutch means being thereupon engaged to cause further rotation of the third member to return the second member to neutralizing position of the first speed ratio means, without disturbing the first member.

37. In a control for a change speed transmission used with a releasable torque transmitting device, the transmission having three forward speed ratio means, operator controlled means including a first member movable from first to second position, connecting means operated by the first member to actuate the first speed ratio means, power mechanism to effectuate the second and third speed ratio means including power means, means to select between the second and third ratio means, means operated upon actuation of the torque transmitting device in its torque releasing operation to render the power means operative to effectuate the selected ratio means, and means operable independently of operation of the power means to render the first speed ratio means ineffective when second and third speed ratio means are to be effectuated.

38. In a control for a change speed transmission used with a releasable torque transmitting device, the transmission having three forward speed ratio means, operator controlled means including a first member movable from first to second position, connecting means operated by the first member to actuate the first speed ratio means, said connecting means being releasable to enable the first speed ratio means to be neutralized without moving the first member from second position, power mechanism to effectuate the second and third speed ratio means, means dependent upon actuation of the torque transmitting device in its torque releasing operation to render the power means operative to effectuate the selected ratio means, and means dependent upon movement of the first member to second position to condition the power means for operation.

39. In change-speed transmissions having actuatable drive-mechanism for activating and inactivating a plurality of different forward speed drives, and actuating means for said drive-mechanism; a manually-operated element movably settable from a first into a second position; a pedally-controlled member movable between two extremes; positive clutch means associated with said drive actuating means, and operable to connect and disconnect the aforementioned element or member and the actuating means for one of said speed drives; means effective to transmit movement of said element when moved from first to second position, upon movement of said member to one of its extremes, through said clutch means to the aforesaid actuating means to activate the one speed drive; and means effective to transmit movement from said member when moved from one extreme to the other, to sequentially operate said clutch means to disconnect said element from said actuating means, and to connect said member to said actuating means whereby the one speed drive is inactivated.

40. A change-speed transmission according to claim 39 wherein a cyclic movement of said element from second to first position and return is effective to restore the clutch means into normally connected relationship thereto, and operable thereby to reactivate the one speed drive by actuating the drive-mechanism thereof while the aforesaid member is positioned in either of its extremes.

41. In control mechanism for a change-speed transmission having at least two operatively engageable and neutralizable gear set drives; clutch means associated with one of said drives and comprising engageable and disengageable positive elements operable selectively to provide one-way and two-way clutching connections with said one drive; a manually-controlled member operatively connected normally with said one drive when neutralized, through the two-way connection of the clutch means to engage and neutralize said one drive when said member is operated from one predetermined position into a second predetermined position and return; a pedally-controlled member operatively connectable with said one gear set drive when engaged, through the one-way connection of the clutch means; and means operable by a unidirectional predetermined operation of said last-named member for disengaging the two-way clutch connection and rendering effective the one-way clutch connection whereby said one drive, if engaged, is neutralized thereby with said first-named member in its second predetermined position.

GLENN T. RANDOL.

REFERENCES CITED

The following references are of record in the file of this patent:

UNITED STATES PATENTS

| Number | Name | Date |
|---|---|---|
| 1,372,204 | Smith | Mar. 22, 1921 |
| 1,499,418 | Stevens | July 1, 1924 |
| 1,626,974 | Schmidt | May 3, 1927 |
| 2,193,432 | Randol | Mar. 12, 1940 |
| 2,222,913 | Pescara | Nov. 26, 1940 |
| 2,263,400 | Schwarz | Nov. 18, 1941 |
| 2,267,464 | Iavelli | Dec. 23, 1941 |
| 2,292,253 | Thurber | Aug. 4, 1942 |
| 2,327,063 | Randol | Aug. 17, 1943 |
| 2,351,067 | Randol | June 13, 1944 |